US008577974B2

(12) United States Patent
Paulsami et al.

(10) Patent No.: US 8,577,974 B2
(45) Date of Patent: Nov. 5, 2013

(54) CONFERENCE SERVER SIMPLIFYING MANAGEMENT OF SUBSEQUENT MEETINGS FOR PARTICIPANTS OF A MEETING IN PROGRESS

(75) Inventors: Prabakar Paulsami, Tirunelveli Dist (IN); Bikram Singh Gill, Mohali (IN)

(73) Assignee: Oracle International Corporation, Redwood Shores, CA (US)

( * ) Notice: Subject to any disclaimer, the term of this patent is extended or adjusted under 35 U.S.C. 154(b) by 382 days.

(21) Appl. No.: 12/831,284

(22) Filed: Jul. 7, 2010

(65) Prior Publication Data

US 2012/0011205 A1 Jan. 12, 2012

(51) Int. Cl.
*G06F 15/16* (2006.01)

(52) U.S. Cl.
USPC ........................................... 709/206

(58) Field of Classification Search
USPC ................................. 709/204, 206
See application file for complete search history.

(56) References Cited

U.S. PATENT DOCUMENTS

| | | | |
|---|---|---|---|
| 6,104,788 A | 8/2000 | Shaffer et al. | |
| 6,539,421 B1 * | 3/2003 | Appelman et al. | 709/206 |
| 6,691,162 B1 * | 2/2004 | Wick | 709/224 |
| 6,988,128 B1 * | 1/2006 | Alexander et al. | 709/206 |
| 7,251,696 B1 * | 7/2007 | Horvitz | 709/228 |
| 7,295,657 B1 * | 11/2007 | Keohane et al. | 379/88.23 |
| 7,305,441 B2 * | 12/2007 | Mathewson et al. | 709/206 |
| 7,383,303 B1 * | 6/2008 | Bort | 709/206 |
| 7,389,351 B2 * | 6/2008 | Horvitz | 709/227 |
| 7,451,184 B2 * | 11/2008 | Malik et al. | 709/206 |
| 7,552,177 B2 * | 6/2009 | Kessen et al. | 709/206 |
| 7,593,984 B2 * | 9/2009 | Morris | 709/203 |
| 7,679,518 B1 * | 3/2010 | Pabla et al. | 340/573.1 |
| 7,730,143 B1 * | 6/2010 | Appelman | 709/206 |
| 7,765,265 B1 * | 7/2010 | Granito et al. | 709/206 |
| 7,774,416 B2 * | 8/2010 | Callanan et al. | 709/206 |
| 7,929,673 B2 * | 4/2011 | Yee et al. | 379/93.21 |
| 7,966,566 B2 * | 6/2011 | Ritter et al. | 715/753 |
| 8,037,147 B1 * | 10/2011 | Herold et al. | 709/206 |
| 8,180,663 B2 * | 5/2012 | Tischhauser et al. | 705/7.19 |
| 8,209,613 B2 * | 6/2012 | Zinn | 715/733 |
| 2002/0169841 A1 * | 11/2002 | Carlson et al. | 709/206 |
| 2003/0018724 A1 * | 1/2003 | Mathewson et al. | 709/206 |
| 2004/0093387 A1 * | 5/2004 | Wick | 709/207 |

(Continued)

OTHER PUBLICATIONS

"Bushan", "New Out of Office Feature in Lotus Notes 8", http://www.maargasystems.com/sme/category/lotus-notesdomino-tips/, Published Date: Feb. 20, 2007, p. 1-6.
"In Onestart, What Is My Calendar, and How Do I Use It?", "Knowledge Base", http://kb.iu.edu/data/amuc.html, Last Update Date: May 18, 2009, p. 1-4.

(Continued)

*Primary Examiner* — Alicia Baturay
(74) *Attorney, Agent, or Firm* — Narendra Reddy Thappeta

(57) ABSTRACT

A conference server, provided according to an aspect of the present invention, identifies a participant of a meeting in progress and requests scheduling option for a subsequent meeting from the identified participant. On receiving a scheduling option from the participant, the conference server determines the possible participants ("recipients") of the subsequent meeting and informs the recipients of the received scheduling option. In one embodiment, the conference server requests the scheduling option when a conflict between the meeting in progress and the subsequent meeting is found and sends notifications to the recipients (determines by examining the calendars of users). In another embodiment, the conference server requests the scheduling option for a follow-up meeting for the meeting in progress, and updates the calendars of the recipients (determined as the participants of the meeting in progress and any users invited).

32 Claims, 12 Drawing Sheets

(56) References Cited

U.S. PATENT DOCUMENTS

| | | | |
|---|---|---|---|
| 2004/0254998 A1* | 12/2004 | Horvitz | 709/206 |
| 2006/0031326 A1* | 2/2006 | Ovenden | 709/206 |
| 2006/0168204 A1* | 7/2006 | Appelman et al. | 709/224 |
| 2007/0005691 A1* | 1/2007 | Pushparaj | 709/204 |
| 2007/0124393 A1* | 5/2007 | Maes | 709/206 |
| 2008/0219445 A1* | 9/2008 | Yato et al. | 380/255 |
| 2008/0228852 A1* | 9/2008 | Husa et al. | 709/201 |
| 2008/0263158 A1* | 10/2008 | del Cacho et al. | 709/206 |
| 2009/0019367 A1* | 1/2009 | Cavagnari et al. | 715/716 |
| 2009/0077180 A1* | 3/2009 | Flowers et al. | 709/206 |
| 2009/0172097 A1 | 7/2009 | O'Sullivan et al. | |
| 2009/0204671 A1* | 8/2009 | Hawkins et al. | 709/204 |
| 2009/0282348 A1 | 11/2009 | McBrearty et al. | |
| 2009/0327429 A1* | 12/2009 | Hughes et al. | 709/206 |
| 2009/0327441 A1* | 12/2009 | Lee et al. | 709/206 |
| 2010/0036928 A1* | 2/2010 | Granito et al. | 709/206 |
| 2010/0268566 A1* | 10/2010 | Maresh et al. | 705/9 |
| 2011/0252097 A1* | 10/2011 | Walker et al. | 709/206 |
| 2012/0011205 A1* | 1/2012 | Paulsami et al. | 709/206 |

OTHER PUBLICATIONS

"Getting Started Information for the eSCHEDULE Pro", "Marcom Consulting", Downloaded Circa, Jan. 1, 2001, p. 1-4.

"Level 1—Calendar—Scheduling Meetings", "Medical University of South Carolina", http://www.musc.edu/infoservices/exchange/faq/level1/meetings.htm, Downloaded Circa, Jan. 1, 2001, p. 1-4.

"Using Outlook Voice Access", "Microsoft Corporation", http://help.outlook.com/en-us/140/dd450793(loband). aspx, Downloaded Circa, Jan. 1, 2001, p. 1-8.

"Mike Tattersall", "How to Send an Outlook Meeting Cancellation Notice to Attendees", http://www.howtodothings.com/computers-internet/how-to-send-an-outlook-meeting-cancellation-notice-to-attendees, Downloaded circa, Jan. 1, 2001, pp. 1-3.

"Calendar", "The University of Alabama", http://helpdesk.ua.edu/training/outlook/calendar.html, Downloaded circa, Jan. 1, 2001, p. 1-16.

"Tiny URL", "Gilby Productions" http://tinyurl.com, Downloaded Circa, Jan. 27, 2010; p. 1-2.

* cited by examiner

FIG. 7A

| Start | End | Event | Meeting ID | Description | Expected Participants | Priority | Remind Before |
|---|---|---|---|---|---|---|---|
| 3/9/2009 2:00 PM | 3/9/2009 3:00 PM | Meeting | 1011 | Discussion on cloud computing security policies | U2, U3 | Medium | 15 mins |
| 3/9/2009 3:30 PM | 3/9/2009 4:00 PM | Meeting | | Client Meeting - Do not Miss | U5 | High | 15 mins |

FIG. 7B

| Start | End | Event | Meeting ID | Description | Expected Participants | Priority | Remind Before |
|---|---|---|---|---|---|---|---|
| 3/9/2009 2:00 PM | 3/9/2009 3:00 PM | Meeting | 1011 | Discussion on cloud computing security policies | U1,U3 | Medium | 10 mins |
| 3/9/2009 4:00 PM | 3/9/2009 7:00 PM | Meeting | 1195 | Monthly project review | U6, U7 | High | 10 mins |

| 800 | Meeting ID 821 | Start 822 | Duration 823 | Description 824 | Meeting Status 825 | Current Participants 826 |
|---|---|---|---|---|---|---|
| 841→ | 1011 | 3/9/2009 2:00 PM | 60 min | Discussion on cloud computing security policies | In Progress | U1, U2, U3 |
| 843→ | 1195 | 3/9/2009 4:00 PM | 180 min | Monthly project review | Planned | - |

*FIG. 8A*

| 850 | User ID 861 | Login ID 862 | Password 863 |
|---|---|---|---|
| 881→ | U1 | S1000 | ** |
| 882→ | U2 | S1003 | ** |
| 883→ | U3 | S1006 | ** |

*FIG. 8B*

CONFERENCE SERVER SIMPLIFYING MANAGEMENT OF SUBSEQUENT MEETINGS FOR PARTICIPANTS OF A MEETING IN PROGRESS

BACKGROUND OF THE INVENTION

1. Technical Field

The present disclosure relates to conference servers, and more specifically to a conference server simplifying management of subsequent meetings for participants of a meeting in progress.

2. Related Art

Conference servers are often used for planning and conducting meetings. Planning typically entails indicating to a conference server the duration (possible start and end times) of a meeting and a number of expected participants. The conference server may then reserve an appropriate amount of resources (e.g., number of ports or permitted simultaneous connections during the call) for the planned meeting in the requested duration.

Several users are invited to participate in such a planned meeting. At least some of the invited users join the meeting in the planned duration and the users joining the meeting are referred to as participants. Some of the users may join and/or leave the conference in the duration of the meeting. Irrespective, the meeting is said to be "in progress" when at least one of the participants is part of the meeting.

When the meeting is in progress, the conference server enables participants to exchange content such as audio (e.g., spoken word of participants), video (e.g., images of participants and/or any presentations type content), files, messages (text), etc., thereby facilitating conducting of the planned meeting.

The inventors of the subject application have noticed that there are several situations in which a participant of a meeting in progress needs to manage subsequent meetings (i.e., those starting after the meeting in progress). For example, an extended duration of the meeting in progress may result in a possible overlap with a next planned meeting, thereby necessitating a participant to manage the resulting conflict. Alternatively, participants of the meeting in progress may wish to plan/schedule a "follow-up" meeting to continue/update the agenda/discussion of the meeting in progress.

The inventors have observed that a participant of a meeting in progress faces considerable difficulty in managing the conflict with subsequent meetings and also in planning follow-up meetings. The inventors therefore propose solutions which simplify management of subsequent meetings for participants of a meeting in progress.

BRIEF DESCRIPTION OF THE DRAWINGS

Example embodiments of the present invention will be described with reference to the accompanying drawings briefly described below.

FIGS. 7A and 7B together depicts a portion of calendar data maintained by a calendar server in one embodiment.

FIGS. 8A and 8B together depicts a portion of meeting data maintained by a conference server in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

A conference server, provided according to an aspect of the present invention, identifies a participant of a meeting in progress and requests a scheduling option for a subsequent meeting from the identified participant. On receiving a scheduling option from the participant, the conference server determines the possible participants ("recipients") of the subsequent meeting and informs the recipients of the received scheduling option.

In one embodiment, the conference server requests the scheduling option when a conflict between the meeting in progress and the subsequent meeting is found and sends notifications to the recipients (determined by examining the calendars of users).

In another embodiment, the conference server requests the scheduling option for a follow-up meeting for the meeting in progress, and updates the calendars of the recipients (determined to be the participants of the meeting in progress and any users invited).

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
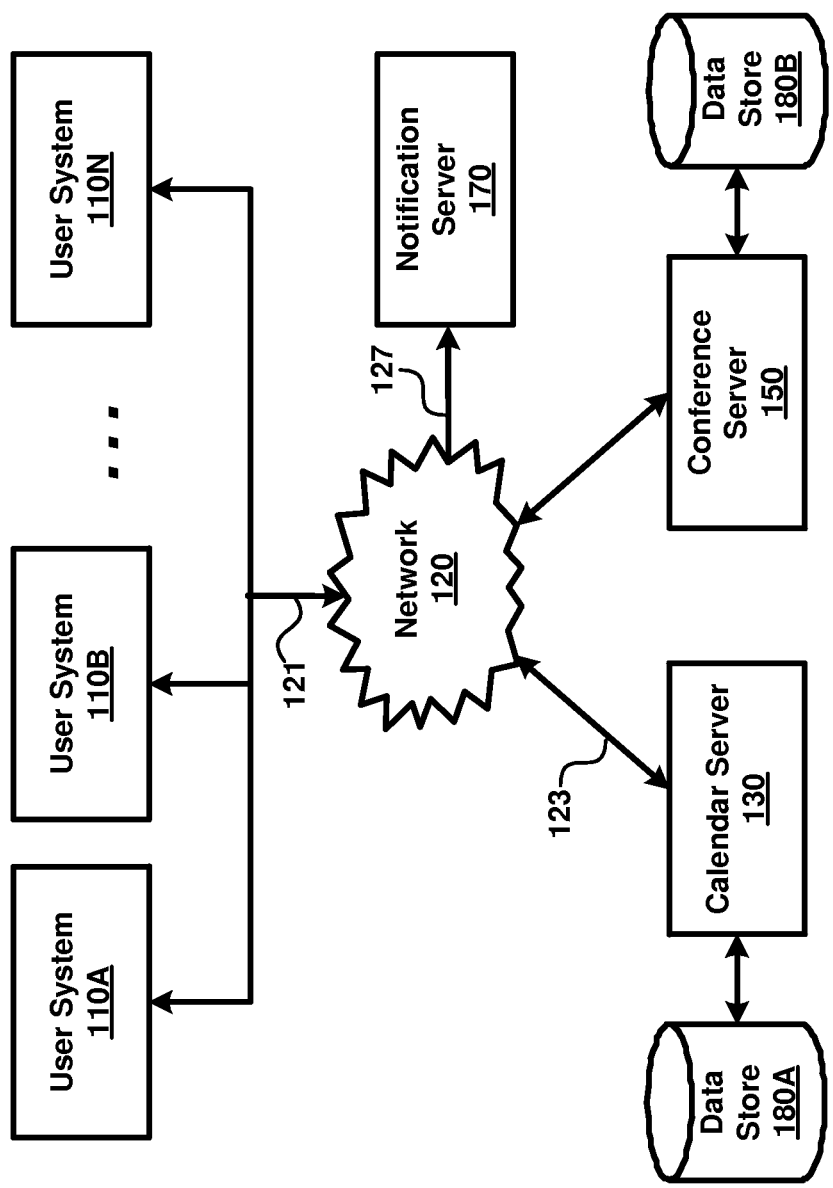
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing user systems 110A-110N, network 120, calendar server 130, conference server 150, notification server 170, and data stores 180A-180B.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between user systems 110A-110N, calendar server 130, conference server 150, and notification server 170. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 120.

Each of data stores 180A-180B represents a non-volatile (persistent) storage facilitating storage and retrieval of a collection of data by applications executing in calendar server 130 and conference server 150. Each of data stores 180A-180B may be implemented as a database server using relational database technologies and accordingly providing storage and retrieval of data using structured queries such as SQL (Structured Query Language). Alternatively, each of data stores 180A-180B may be implemented as a file server providing storage and retrieval of data in the form of files organized as one or more directories, as is well known in the relevant arts.

Data store 180A may maintain the calendar information for different users including the events (such as meetings) scheduled for each user, the start time (and possible end time) of each of the events, a priority associated with each event, a reminder duration before which a reminder/alert for an event is to be sent to a user, etc. Data store 180B may maintain information related to multiple meetings including the users taking part in each meeting, the start time (and possible end time) of each meeting, the status (e.g., in progress, scheduled, completed, etc.) of each meeting, the participants of each meeting in progress, etc.

Each of user systems 110A-110N represents a system such as a personal computer, workstation, mobile device (e.g., cell phone), etc., used by users to generate user requests to business applications executing in server systems such as calendar server 130, conference server 150 or notification server 170. The requests may be generated using appropriate user interfaces (typically provided by corresponding client applications executing in the user system). In general, a user system sends requests to a server system for performing specific tasks and receives as corresponding responses the results of performance of the requested tasks. Each request is sent in the form of an IP packet directed to the desired server system, with the IP packet including data identifying the requested tasks in the payload portion.

Each of calendar server 130, conference server 150 and notification server 170 represents a corresponding server system such as a web/application server executing business applications capable of performing tasks requested by users using user systems 110A-110N. Each server system is characterized by being a separate physical unit. However, alternative embodiments can be implemented with one or more of these three servers merged into a single physical unit.

Notification server 170 executes applications (such as email server, chat server, messaging server, etc.) designed to receive notifications from source systems (such as user systems 110A-110N, calendar server 130, conference server 150, etc.) and to deliver/distribute the received notifications to the appropriate destination systems (based on a destination address specified in the notifications). The notifications may be one of, but not limited to, emails, chat messages, short message service (SMS) messages, multimedia message service (MMS) messages, etc.

In an embodiment, a server application executing in notification server 170 stores the received notifications (sorted by the destination system/address), and a corresponding notification client application executing in the destination system periodically checks and retrieves the stored notifications from notification server 170. Alternatively, the server application may send (push) the notifications to the destination systems in response to receiving the notifications.

Notification server application can be implemented, for example, as corresponding components of Oracle Beehive Collaboration Software available from Oracle Corporation and Microsoft Exchange Server available from Microsoft Corporation, while examples of notification client applications are Microsoft Outlook and Outlook Express both available from Microsoft Foundation and Mozilla Thunderbird available from Mozilla Foundation.

Calendar server 130 executes applications (such as calendar server, etc.) facilitating users (using user systems 110A-110N) to manage their respective calendars and to share their calendars with other users. In particular, a user may perform various tasks such as adding new events associated with desired dates/times in his/her calendar, editing/removing events existing in the calendar, setting reminders for the events (whereby calendar server 130 sends notifications for the events), viewing events by date/week/month/year, sharing one or more events (or the calendar as a whole) with other users, etc. In general, users use a calendar client application (or a browser) executing on the user system to send requests (for performing one or more of the tasks noted above) to calendar server 130.

Calendar server applications can be implemented, for example, as corresponding components of Oracle Beehive Collaboration Software or using Darwin Calendar Server available from Apple Corporation, while examples of calendar client applications are Oracle Calendar Web/Desktop Client available from Oracle Corporation, Microsoft Outlook available from Microsoft Corporation and Mozilla Sunbird available from Mozilla Foundation.

Conference server 150, as noted in the Background section, executes applications (such as conference server, etc.) facilitating one or more users (using user systems 110-110N) to plan and conduct meetings. Users typically use conference client applications executing in user systems 110A-110N for conducting the meeting.

Conference server applications can be implemented, for example, as corresponding components of Oracle Beehive Collaboration Software (noted above) or WebEx Meeting Center available from Cisco Corporation. Examples of conference client applications are web client interfaces provided by Oracle Collaboration and Beehive Collaboration Suites, both available from Oracle Corporation.

The manner in which one or more users (such as users U1, U2 and U3) may plan a meeting is described below with examples.

3. Planning a Meeting

Figure 2:
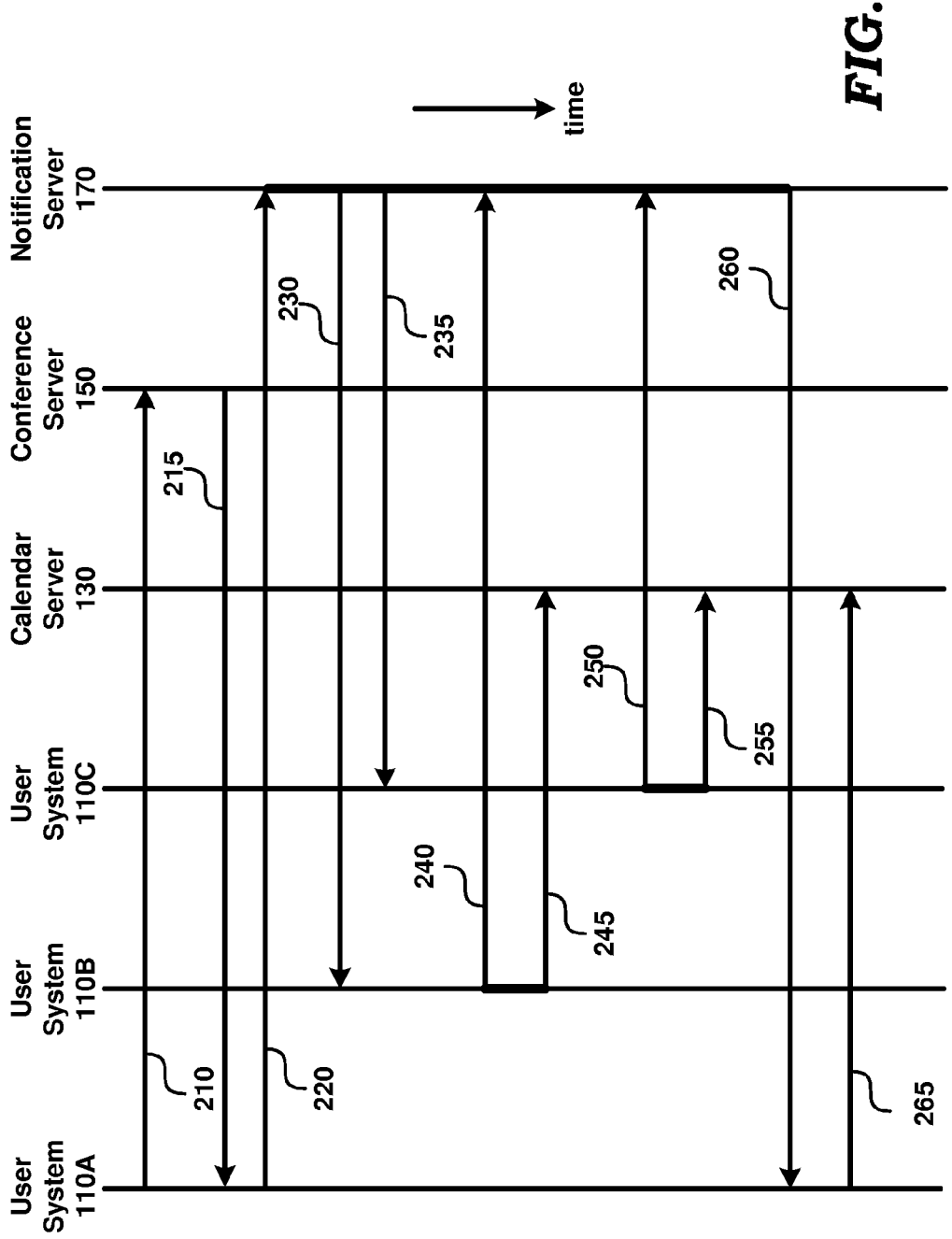
FIG. 2 is a sequence diagram illustrating the manner in which a meeting is planned using a conference server in one embodiment.

FIG. 2 is a sequence diagram illustrating the manner in which a meeting is planned using a conference server (150) in one embodiment. The description is continued assuming that three users U1, U2 and U3 using respectively user systems 110A-110C wish to participate in a meeting.

Accordingly, one of the users (assumed to be U1 using user system 110A) sends a request for creating a new meeting to conference server 150 (step 210). The user U1 may send the request using a user interface provided by a conference client application or a browser displaying web pages provided by the conference server application. The request may include a proposed start time, a proposed end time (or duration) for the meeting, a description/agenda for the meeting, and number of participants expected in the meeting (3 corresponding to users U1, U2, and U3 in this example).

Conference server 150, in response to the request, sends an acknowledgement confirming the creation of the meeting (step 215). The acknowledgement may include authentication information such as a unique meeting identifier and/or corresponding passwords (both generated by conference server 150) to be used by the users when joining the meeting (and for the owner/user U1 to administer the meeting). Conference server 150 may send acknowledgement only after confirming any necessary resources (e.g., number of ports, network bandwidth, processing/CPU resource) are available for the requested duration at least with some pre-specified probability.

User U1, using user system 110A, sends invitations to the other users (U2 and U3) who may wish to participate, in the newly created meeting in the form of a notification (containing the destination address of users U2 and U3) to notification server 170 (step 220), which then delivers/distributes the notification to the corresponding destination/user systems 110B and 110C (steps 230 and 235). The notifications may include the details of the meeting such as the proposed start and end times, the agenda for the new meeting, and the authentication information for the meeting. In addition, the notifications may include links by which the recipient user can accept or reject the proposed new meeting.

In a scenario that user U2 wishes to participate in the new meeting, user U2 sends an accept notification (step 240) as a response to the invitation notification (step 230). The accept notification may be sent when user U2 selects the corresponding link provided in the invitation notification. User U2 may also (manually) add a new event for the meeting at the proposed start time to his/her personal calendar maintained on calendar server 130 regarding the newly created meeting (step 245). In one embodiment, a notification client application executing in user systems 110B is designed to send the accept notification and also to update the calendar information of user U2 when the "accept" link provided in the invitation notification is selected by user U2. Similarly, user U3 may also send an accept notification (step 250) and update his/her calendar maintained on calendar server 130 (step 255).

It may be appreciated that in the scenario that the proposed start time is not acceptable, users U2 and U3 may interact with user U1 to come to an agreement upon a start time (and possibly an end time) for the proposed meeting. Though not shown, user U1 may then amend the start/end times of the new meeting to the agreed start/end times (similar to step 210) and resend the invitations again to users U2 and U3 for acceptance (similar to step 220).

Notification server 170 forwards the accept notifications received in steps 240 and 250 to user U1 (step 260), thereby enabling user U1 to add a new event for the confirmed meeting to his/her calendar maintained on calendar server (step 265). In one embodiment, the confirmation of the meeting is generated by notification server 170, with a notification client application executing in user systems 110A designed to display the confirmation to user U1 and also to update the calendar information of user U1 in response to receiving the confirmation from notification server 170.

Though not shown, it may be appreciated that calendar server 130 may store the new events (for the new meeting) in the calendars of users U1, U2 and U3 in data store 180A, while conference server 150 may store the information regarding the new meeting such as the start/end times, the meeting agenda, authentication information (including the meeting identifier and/or password), etc. in data store 180B (in response to the request from user U1 in step 210).

Thus, conference server 150 and calendar server 130 together facilitates users U1, U2 and U3 to plan/schedule a new meeting. Each of the users U1, U2 and U3 may similarly schedule one or more meetings with other users. The manner in which a scheduled/planned meeting may be conducted using conference server 150 is described below with examples.

4. Conducting a Meeting

Figure 3:
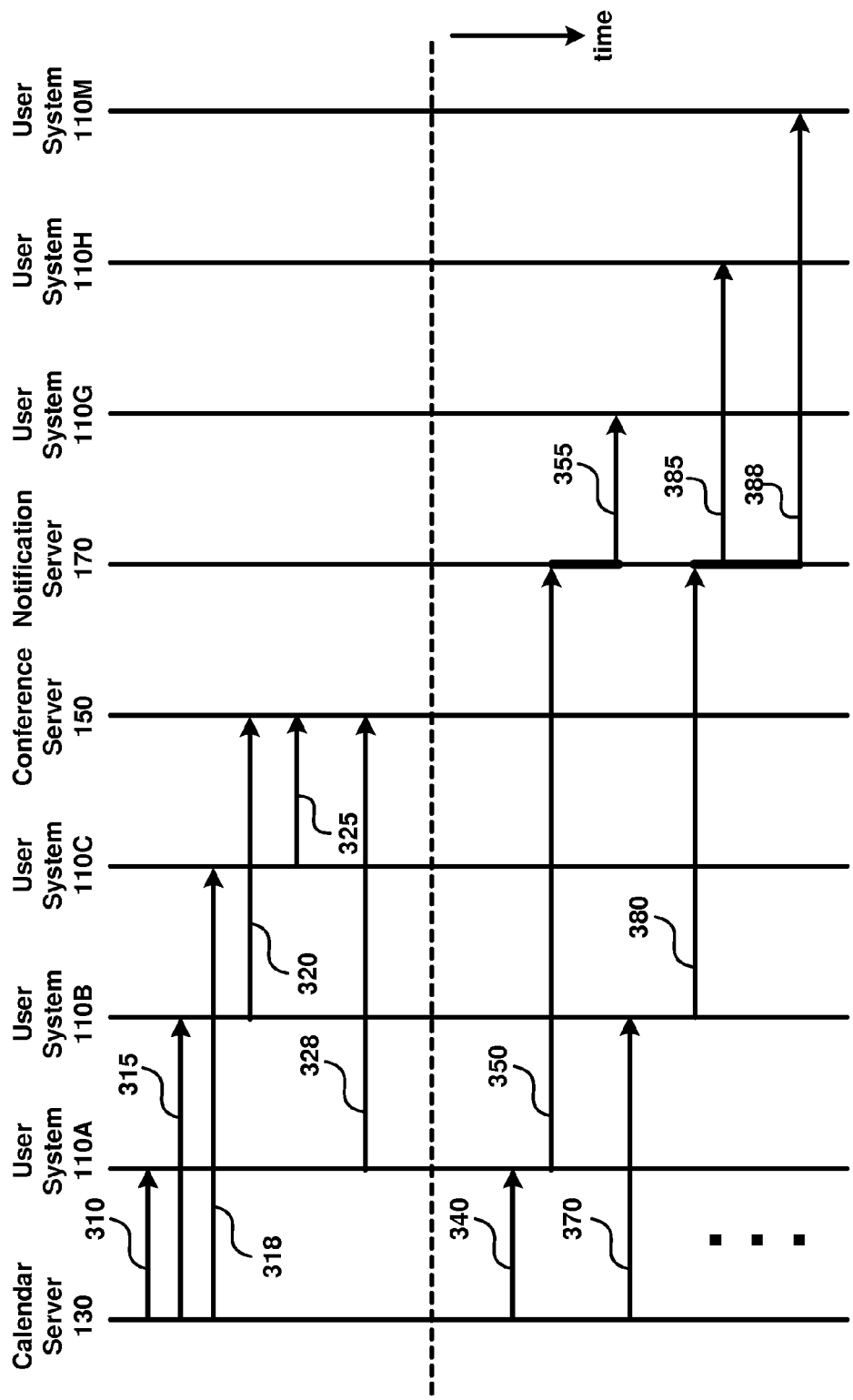
FIG. 3 is a sequence diagram illustrating the manner in which a scheduled meeting is conducted using a conference server in one embodiment.

FIG. 3 is a sequence diagram illustrating the manner in which a scheduled meeting is conducted using a conference server (150) in one embodiment. The description is continued assuming that the new meeting created above by users U1, U2 and U3 is being conducted using conference server 150.

Accordingly, calendar server 130 is shown sending respective reminders (steps 310, 315 and 318) to users U1, U2 and U3 regarding the newly created meeting. The reminders may be sent before a reminder duration (e.g., 10 minutes, 15 minutes, etc.) specified by each of the users. Calendar server 130 may send the reminders in response to identifying the events for the newly created meeting stored in data store 180.

A calendar client application executing in user systems 110A-110C may be designed to provide a corresponding alert (including text, audio, video content) to the user in response to receiving a reminder from calendar server 130. The reminder/alert may indicate the scheduled duration (start and end times), the agenda of the meeting, the details of the other users that may participate in the meeting, and also the authentication information to be used for joining the meeting.

At least some of the users (who agreed to take part in a meeting and to whom reminders have been sent) may join the meeting in the scheduled duration (and are referred to as participants). The description is continued assuming that all the users (U1, U2 and U3) who agreed to take part in the meeting (accepted the meeting invitations) take part in the meeting created by operation of the steps of FIG. 2. It is further assumed that the users join the meeting in the order U2, U3 and U1.

Accordingly, user U2 is shown joining the meeting (step 320) followed by user U3 joining the meeting (step 325) and then user U1 joining the meeting (step 328). To join/participate in meeting, each user may have to use a conference client application (executing in the corresponding user system) to login (provide authentication) to conference server 150 using the authentication information provided earlier (in the meeting invitations, and which may be sent again as part of the reminders).

Conference server 150 may authenticate the users of the meeting based on the authentication information provided by the users at login and that stored in data store 180B (when the meeting was created by steps of FIG. 2). It may be appreciated that different users (e.g., the owner/user U1 who created the meeting as compared to the other users) may be required to perform different authentication steps (as well as use different authentication information).

Conference server 150 then provides, to the authenticated users/participants of the meeting, user interfaces (either as web pages that can be displayed using a browser or using a conference client application on user systems 110A-110N) that enable the participants to exchange content such as audio (e.g., spoken word of participants), video (e.g., images of participants and/or any presentations type content), files, messages (text), etc., thereby facilitating conducting of the scheduled meeting.

In one embodiment, conference server 150 enables one participant to share the desktop (a user interface provided by an operating system) of his/her user system with other participants, thereby enabling the other participants to remotely view/access/interact with the shared user system. In general, conference server 150 receives content from one participant and forwards the received content to other participants.

As noted above, though some of the users (such as U1, U3) may join and/or leave the conference in the duration of the meeting, the meeting is said to be "in progress" when at least one of the participants (e.g. U2) is part of the meeting. In other words, the meeting noted above is said to be "in progress" after step 320, when user U2 has joined the meeting. Though not shown, conference server 150 may update the meeting information stored in data store 180B to reflect the "in progress" status of the meeting as well as the participants (U1, U2 and U3) who are currently participating in the meeting.

It may be appreciated that the participants of a meeting (such as users U1, U2 and U3) may wish to manage subsequent meetings while the current meeting is in progress. For example, a participant of a current meeting (in progress) may wish to reschedule a subsequent meeting if the participant anticipates that the current meeting may end after (and as such, overlap with) the start time of the subsequent meeting. Alternatively, a participant of the current meeting may wish to plan/schedule a follow-up meeting. The manner in which participants of a meeting in progress may manage such conflicts is first described below with examples, followed by the manner in which participants schedule a follow-up meeting.

5. Management of Subsequent Meetings

Referring again to FIG. 3 (the steps below the dotted line), user U1 (using user system 110A) participating in a current meeting in progress (as indicated by step 328) may have a subsequent meeting scheduled with some of a different set of users (assumed to be user U5 for convenience). Accordingly, user U1 may receive a reminder from calendar server 130 indicating the details of the subsequent meeting (step 340). The reminder may be received at a reminder duration (specified by user U1) before the start time of the subsequent meeting. For example, assuming that user U1 has set the reminder duration to 10 minutes, the reminder may be sent 10 minutes before the start of the subsequent meeting (irrespective of whether the user is currently participating in a meeting or not).

User U1 may wish to continue participating in the current meeting with users U2 and U3 as well as to participate in the next meeting (which user U1 may deem to be as important as the current meeting) after the current meeting is completed. As such, user U1 may wish to inform the possible participants (user U5) of the subsequent meeting that he/she may be delayed by a fixed duration (e.g., 30 minutes, 1 hour), or may wish to request the subsequent meeting to be rescheduled/cancelled.

In one embodiment, user U1 is required to manually send notifications to the possible participants of the subsequent meeting for managing the conflict between the current and subsequent meetings. Thus, user U1 may use a notification client application (such as a email client) to create the notification addressed to users (such as U5) who may possibly participate in the subsequent meeting and send the notification to notification server 170 (step 350), which in turn forwards the notification to the corresponding destination systems, such as user system 110G for user U5 (step 355).

Similarly, user U2 participating in the current meeting (as indicated by step 320) and having a subsequent meeting scheduled with another set of users (assumed to be U6 and U7) is shown manually sending a notification to notification server 170 (step 380) in response to receiving a reminder from calendar server 130 (step 370). Notification server 170 is shown distributing the notification (steps 385 and 388) to the destination systems (user systems 110H and 110M) corresponding to the users U6 and U7. The same/different users of a meeting in progress may similarly receive and manage the conflict with the meetings scheduled/planned after the current meeting (as indicated by the dots after step 370).

Such an approach has several disadvantages, in addition to requiring the user to manually send the messages. One disadvantage is that a user (such as U1) may have to determine the address information (such as email address, phone numbers, etc.) of the possible participants of the subsequent meeting to facilitate sending the notifications.

Another disadvantage is that a user may have to remember (and take into consideration when sending the notifications) the type of notifications to be sent to each of the possible participants (such as user U5) of the subsequent meeting. For example, one of the possible participants may be reachable only over the telephone (requiring user U1 to send phone type notifications such as SMS, MMS, etc.), while another possible participant may prefer to receive email notifications.

An additional disadvantage is that notification client applications (used to manually create and send the notifications) commonly provide separate user interfaces that are displayed superimposed on the user interface provided by the conference client application, thereby interfering with the conducting of the meeting (in particular, when the desktop of a user is shared with other users). The use of some notification types (such as phone type notifications) may also require the user to use an additional device (such as a mobile phone) different from the user system, again interfering with the participation in the meeting.

Thus, the approach of requiring a participant to manually send notifications for management of meetings with possible overlap may force the participant to spend considerable time and resources. Accordingly, it may be desirable that the management of such conflicts (of overlap in the durations of meetings) be simplified.

Furthermore, a participant of a meeting in progress may wish to plan/schedule a follow-up meeting for continuing (and/or update) the agenda/discussions of the meeting in progress. In one approach, the scheduling of the follow-up meeting is done manually (similar to the steps of FIG. 2) by one of the participants of the meeting is in progress. For example, user U1 may perform the steps of FIG. 2 to plan/schedule a follow-up meeting during or after the current meeting. Such an approach may again force the participant to spend considerable time/resources for scheduling the subsequent follow-up meeting.

Conference server 150, provided according to an aspect of the present invention, simplifies the management of subsequent meetings (in particular, the management of the possible overlap with subsequent meeting and the scheduling of a follow-up meeting) for participants of a meeting in progress as described below with examples.

6. Simplifying Management of Subsequent Meetings

Figure 4:
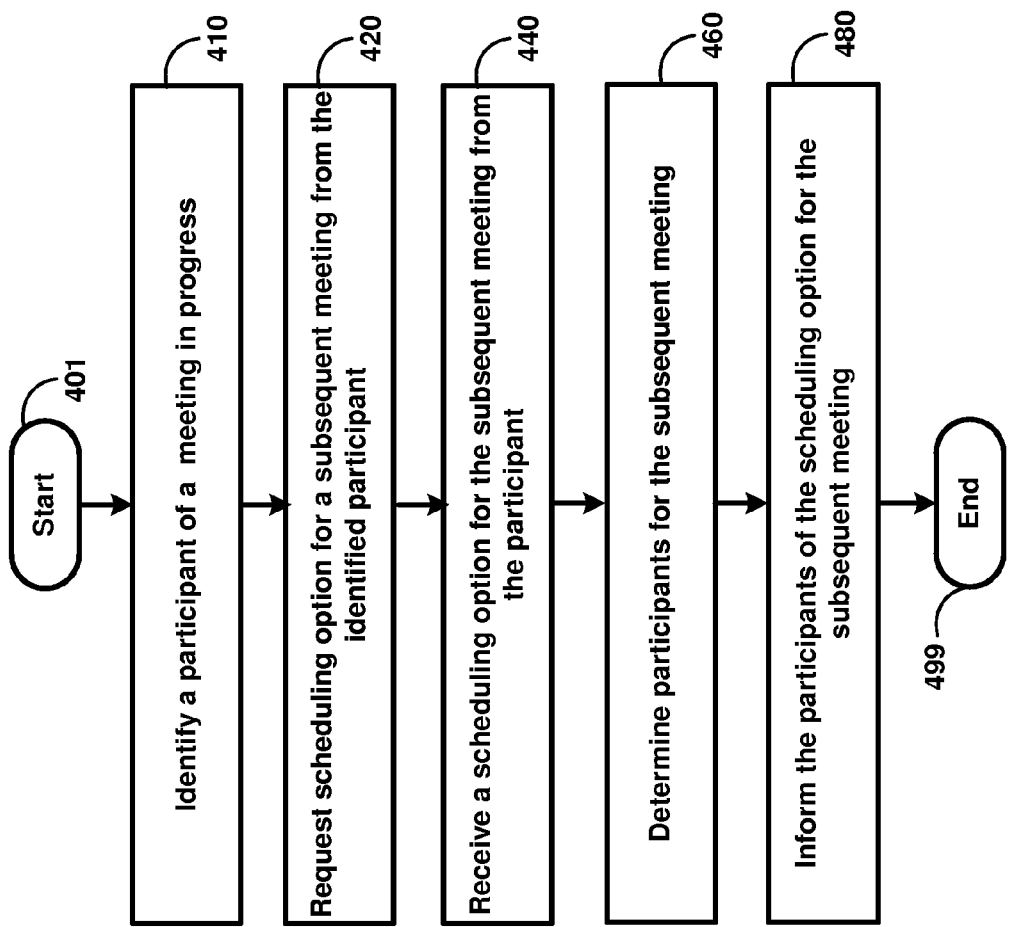
FIG. 4 is a flow chart illustrating the manner in which the management of subsequent meetings for participants of the meeting in progress is simplified according to an aspect of the present invention.

FIG. 4 is a flow chart illustrating the manner in which the management of subsequent meetings for participants of the meeting in progress is simplified according to an aspect of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 401, in which control immediately passes to step 410.

In step 410, conference server 150 identifies a participant of a meeting in progress. If an authenticated user has not left (not logged out of) a meeting in progress, she or he may be identified as a participant of the meeting in progress.

In one embodiment, conference server 150 maintains a meeting information in data store 180B indicating the users/participants who have successfully authenticated and joined a conference conducted by conference server 150. Conference server 150 also updates the status of each of the participants during the conducting of the meeting (for example, by periodically checking whether each participant has logged out), and also the status of the meeting (as "in progress", "completed", etc.). Conference server 150 then examines the meeting information stored in data store 180B to identify the participants of a meeting in progress based on meeting and user status.

In step 420, conference server 150 requests scheduling option for a subsequent meeting from the identified participant. A scheduling option necessarily relates to planning (including cancelling) such a subsequent meeting. The request may be in the form of a notification or as a user interface displayed to the user.

In step 440, conference server 150 receives a scheduling option for the subsequent meeting from the participant as a response to the request of step 420. The received scheduling option will generally reflect the planning desired by the participant (to whom the request of step 420 was sent) and also depend on the reason/nature of the subsequent meeting (as described below with examples).

In step 460, conference server 150 determines the possible participants ("recipients") for the subsequent meeting. The determination may be performed by inspecting the sources of data as suited for the specific context.

In step 480, conference server 150 informs the possible participants/recipients of the scheduling option for the subsequent meeting, for example, by sending notifications to the recipients regarding the scheduling option or by updating the calendars of the recipients. The recipients are accordingly kept informed of the status of the participant, thereby facilitating the management of subsequent meetings. The flowchart ends in step 499.

It may be appreciated that the notifications/calendar updates that were sent/performed manually by a participant in the above noted approach are now sent/performed "automatically" (without manual intervention) with a participant of a meeting in progress merely required to send a scheduling option to conference server 150. Accordingly, the time and resources spent by the participant is considerably reduced.

The features of FIG. 4 can be implemented in various environments. The manner in which the approaches can be used to address the deficiencies noted with respect to FIG. 3 is described below for illustration.

7. Illustrative Example

Figure 5:
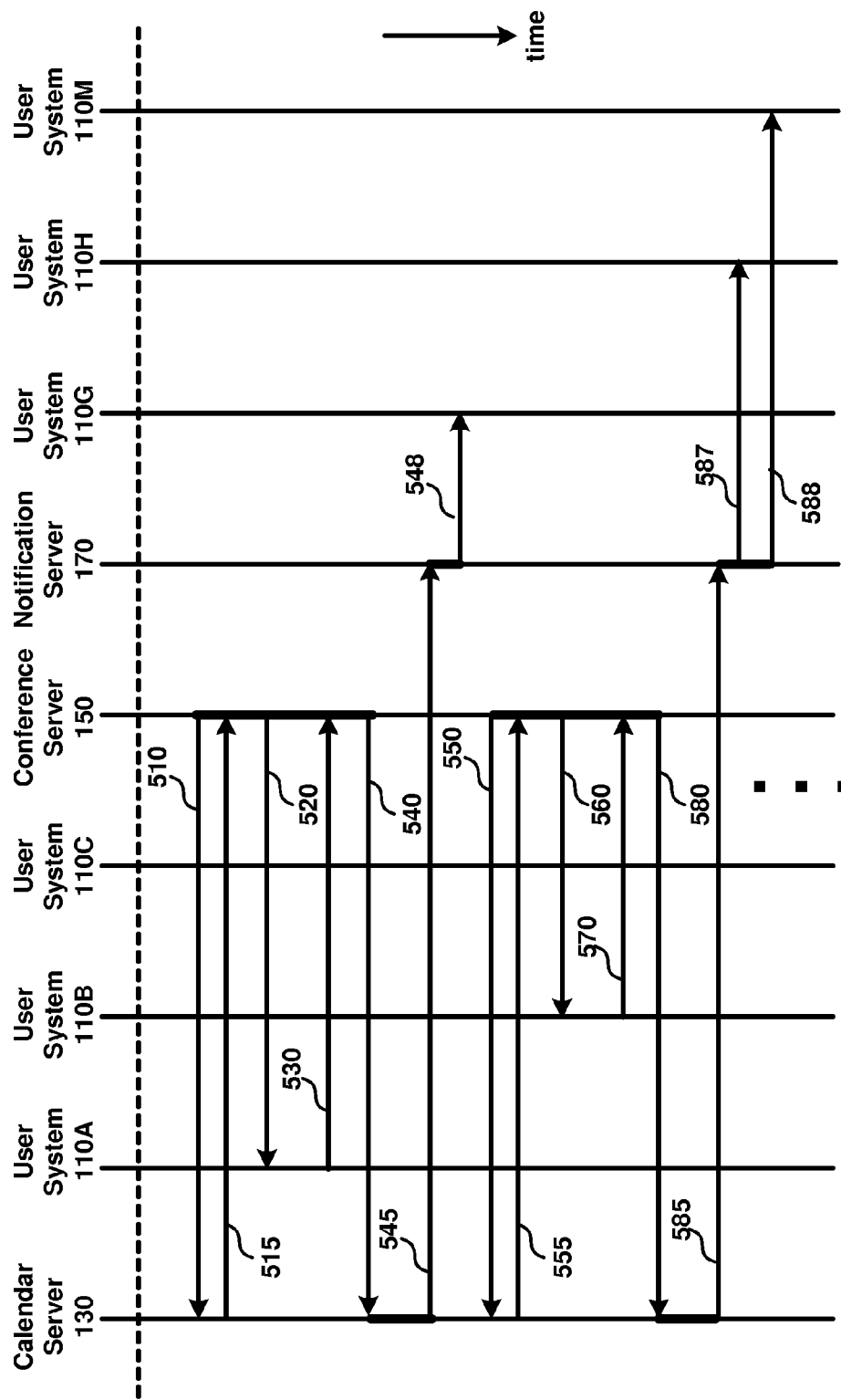
FIG. 5 is a sequence diagram illustrating the manner in which the management of subsequent meetings for participants of a meeting in progress is simplified by a conference server in one embodiment.

FIG. 5 is a sequence diagram illustrating the manner in which the management of subsequent meetings for participants of a meeting in progress is simplified by a conference server (150) in one embodiment. For illustration, it is assumed that users U1, U2 and U3 are currently participating in a meeting conducted using conference server 150 (that is, the steps 310 though 328 above the dotted line in FIG. 3 have already been performed).

Conference server 150 identifies that user U1 is a participant of a meeting in progress (e.g., based on meeting information stored in data store 180B). As noted above, conference server 150 may identify a participant based on the meeting information (the meeting status, the list of current participants, etc.) maintained in data store 180B.

Conference server 150 may then find subsequent meetings that may have a conflict with the meeting in progress for the identified participant. In one embodiment, a conflict is found if a subsequent meeting is scheduled to start within a next duration. The existence of such a subsequent meeting implies that if the meeting in progress is continued by the next duration, it will result in an overlap between the meeting in progress and the subsequent meeting. The next duration may be configured to be the same for all participants or may be specified by each participant.

Accordingly, conference server 150 first determines the meetings scheduled for user U1 by sending a corresponding request for the meetings scheduled for user U1 to calendar server 130 (step 510) and receiving a corresponding response (steps 515) specifying the details (such as start and end times) of the meetings scheduled for user U1. Conference server 150 then checks whether any of such meetings (specified in the response received in step 515) is scheduled to start within a next duration, that is, whether the difference between the current time and the start time of the subsequent meeting is within the next duration.

On determining that a subsequent meeting (with user U5) is scheduled to start within a next duration for user U1, conference server 150 requests a scheduling option for the subsequent meeting (found to have a conflict with the meeting in progress) from the participant (step 520). In one embodiment, conference server 150 provides a set of scheduling options for managing the conflict with the subsequent meeting. The scheduling option may correspond to a duration by which the subsequent meeting is sought to be postponed, a proposed start and end dates/times to which the subsequent meeting is sought to be rescheduled, or an indication to cancel the subsequent meeting.

The scheduling options may be provided in a user interface (e.g., a pop-up window) displayed on the user system (110A-110N) used by the participant. Alternatively, the scheduling options may be provided in the form of an alert notification (such as an email, SMS, etc.) containing links (or indicating a pre-defined text) corresponding to each option. The participant may then select the desired scheduling option by clicking the corresponding link or alternatively, sending the corresponding pre-defined text as a reply to the alert notification.

Alternatively, conference server 150 may request a scheduling option for a follow-up meeting to user U1 in step 520. Conference server 150 may request the scheduling option in response to a participant indicating his/her desire to leave (logout of) the meeting in progress (and accordingly may not perform steps 510 and 515). The scheduling option may correspond to the details such as a proposed start and end date/time, an agenda/description, a list of users invited, etc. of the follow-up meeting.

In one embodiment, the request for the follow-up meeting is in the form of a checkbox included in the user interface shown to user U1 for confirmation of the exit. In response to user U1 selecting/clicking the checkbox, a "New Event" user interface for providing a scheduling option (such as the date/time, description, etc.) for the follow-up meeting is displayed to the user (U1).

On receiving a scheduling option from user U1 (step 530), conference server 150 determines the possible participants ("recipients") for the subsequent meeting and then informs the recipients of the scheduling option for the subsequent meeting. In one embodiment, calendar server 130 is designed to perform the steps of determining the recipients and informing the recipients of a scheduling option in response to a scheduling request containing the scheduling option.

Accordingly, conference server 150 is designed to send a scheduling request containing the scheduling option received from the participant to calendar server 130 (step 540), to cause the recipients to be determined and informed of the participant scheduling option. The received scheduling option (in step 530) may be one of the set of scheduling options provided to the user (U1) for managing subsequent meeting having possible overlap with the meeting in progress or may be specified by the user (U1) using the "New Event" user interface provided for planning a follow-up meeting.

In response to the scheduling request, calendar server 130 determines the corresponding possible participants/recipients (user U5) for the subsequent meeting based on the calendar information stored in data store 180A. For example, calendar server 130 may identify the recipients as the users who have events scheduled for the subsequent meeting in their respective calendars stored in data store 180A. Alternatively, the calendar information may specify the possible participants for each meeting scheduled for each user, and accordingly calendar server 130 may determine the recipients by inspecting the calendar information of the identified participant.

Calendar server 130 then informs the determined recipients of the scheduling option received from the participant, for example, by sending notifications to the recipients regarding the scheduling option or by updating the calendars of the recipients. Accordingly, calendar server 130 is shown sending a notification to user systems 110G used by user U5 (steps 545 and 548) informing user U5 of the scheduling option specified by the participant U1 for the subsequent meeting.

Though the steps of determining and informing the recipients are described above as being performed by calendar server 130, it may be appreciated, that in alternative embodiments, the steps may be performed by conference server 150. In such an alternative embodiment, conference server 150 receives a list of possible participants during the creation of a meeting (in step 210) and stores the received list as part of the meeting information in data store 180B. As such, conference server 150 determines the possible participants specified for the subsequent meeting by inspecting the meeting information in data store 180B, and then sends the notifications to the determined recipients (similar to steps 545 and 548).

In the scenario that the scheduling option is for planning/scheduling a subsequent follow-up meeting, calendar server 130 determines the recipients as the participants of the current meeting (users U1, U2 and U3) and additional users invited for the follow-up meeting (assumed to be none in the following description). Calendar server 130 then updates the corresponding calendar of each of the determined participants (U1, U2 and U3) by adding an event for the follow-up meeting (according to the scheduling option received from the participant). Calendar server 130 may then send a notification of the newly added events to users U1, U2 and U3 (not shown in FIG. 5).

The steps of FIG. 4 may similarly be repeated for another participant of the meeting in progress. For example, conference server 150 may determine that user U2 has another subsequent meeting (due to start within a next duration) with users U6 and U7 by interacting with calendar server 130 (steps 550 and 555), provides user U2 with a set of scheduling options for the another subsequent meeting (step 560), receives a scheduling option (selected from the set) from user U2 (step 570) and then sends a scheduling request to calendar server 130 (step 580). Calendar server 130, in response to the scheduling request, sends notifications (via notification server 170) to users U6 and U7 according to the selected scheduling option (steps 585, 587, and 588).

The steps of FIG. 4 may be repeatedly performed by conference server 150 for each participant of each meeting conducted using conference server 150 (as indicated by the dots), to ensure that the possible participants of subsequent meetings are kept informed of the status of the participant, thereby facilitating the management of subsequent meetings.

As calendar server 130 is designed to store and use personal information of the recipients, the participant of the meeting in progress is relieved of the burden of remembering (and taking into consideration) such information. Furthermore, the scheduling option may be provided without interfering with the conducting of and/or the user participation in the present meeting, since the requests are from conference server 150.

Thus, the management of subsequent meetings for participants of a meeting in progress is simplified. The manner in which conference server 150 may be implemented to provide the various features of the invention is described below with examples.

8. Example Implementation

FIGS. 6, 7A-7B, 8A-8B, 9 and 10A-10B together illustrate the manner in which a conference server (150) simplifying management of subsequent meetings for participants of a meeting in progress is implemented in one embodiment. Each of the Figures is described in details below.

Figure 6:
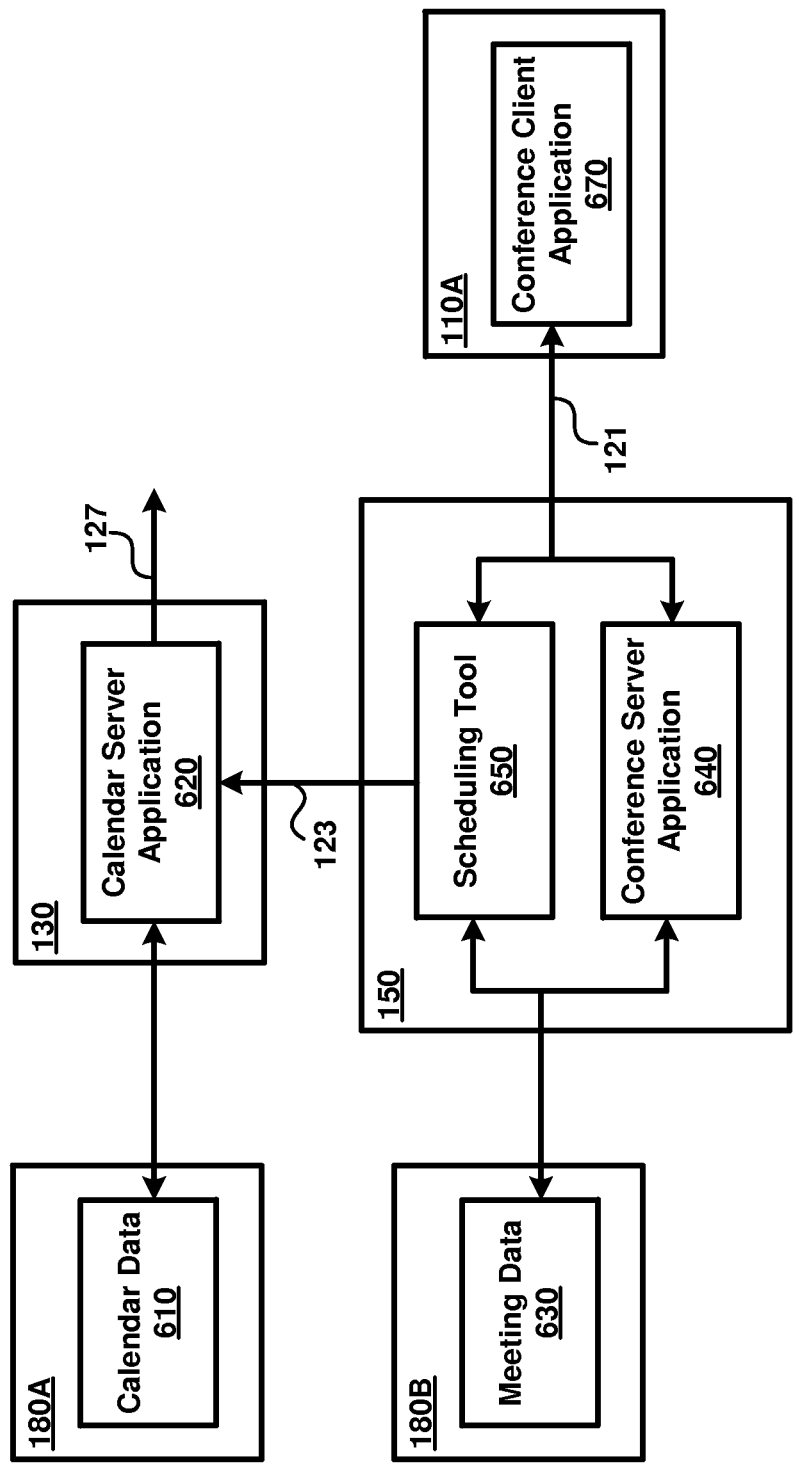
FIG. 6 is a block diagram depicting the manner in which a conference server is implemented in one embodiment.

FIG. 6 is a block diagram depicting the manner in which a conference server (150) is implemented in one embodiment. The block diagram is shown containing calendar data 610, calendar server application 620, meeting data 630, conference server application 640, scheduling tool 650 and conference client application 670. Each of the blocks is described in detail below.

Calendar data 610 (in data store 180A) represents a portion of the calendar information maintained by calendar server 130, in particular, calendar server application 620 A sample data that may be stored in calendar data 610 is described below with examples.

9. Sample Calendar Data

FIGS. 7A and 7B together depicts a portion of calendar data (610) maintained by a calendar server (130) in one embodiment. The calendar data (and the meeting data of FIGS. 8A and 8B) is shown in a tabular format merely for convenience. However, in alternative embodiments, the calendar/meeting data may be according to other formats such as extensible markup language (XML) as will be apparent to one skilled in the relevant arts by reading the disclosure herein.

Each of tables 700 and 750 represents a calendar in calendar data 610 stored associated with a corresponding user (U1 and U2). Only the events relevant to understanding the features of the present invention are shown in the tables/calendars, though in a common scenario, there may be a large number of events stored in each calendar. Thus, table 700 shows the relevant events in the calendar of user U1, while table 750 depicts the relevant events in the calendar for user U2.

Columns 721 "Start" and 722 "End" respectively specify the start and end date/time of an event, column 723 "Event" specifies the type of event (with the text "Meeting" in all the rows, indicating that all the events are of type meetings), column 727 "Priority" specifies the priority indicated by the user (U1 or U2) for the event and column 728 "Remind Before" specifies the duration (again indicated by the user) before which a reminder is to be sent to the user (U1 or U2) for the corresponding event.

The data in columns 724-726 represents information that may be stored for events of the type "Meeting". In particular, column 724 "Meeting ID" specifies the unique identifier associated with the meeting by conference server 150 (with a blank value indicating that the meeting is being conducted offline, such as face-to-face or over a phone), column 726 "Description" specifies the agenda/description of the meeting, and column 727 "Expected Participants" specifies the users who are expected to take part in the meeting (based on which of the users accepted the invitations sent for the meeting).

Though not shown, additional information such as the IP address of the conference server (such as 150) to be used for conducting a meeting, the number of users specified when the meeting was created, the conference client application to be used, etc. that may be required for the user to participate in the associated meeting event may also be stored as part of calendar data 610.

Each of rows 741-742 specifies the details of a corresponding event for the user U1. In particular, row 741 specifies that user U1 has a meeting with id "1011" with users U2 and U3 from "3/9, 2009 2:00 PM" to "3/9, 2009 3:00 PM" for "Discussion on cloud computing security policies". Row 741 further specifies that the user U1 has set a medium priority for the meeting and that a corresponding reminder for the meeting is to be sent 15 minutes before the start time of the meeting.

Similarly, the other rows in table 700 specify the details of corresponding events scheduled for user U1, while the rows of table 750 specify the details of corresponding events scheduled for user U2. It may be observed that rows 741 and 781 refer to the same meeting "1011", and that rows 742 and 782 specify subsequent meetings scheduled (immediately) after the meeting "1011" for the respective users U1 and U2. The calendars of other users such as U3, U5, U6 and U7 may similarly be maintained as part of calendar data 610.

Referring back to FIG. 6, calendar server application 620 (executing in calendar server 130) facilitates users to manage their respective calendars (e.g., to add events for a newly created meeting) and to share their calendars with other users.

Calendar server application 620 maintains the calendar information of the different users as calendar data 610 in data store 180A. For example, calendar server application 620 may add rows 741 and 781 in response to receiving the respective update requests of steps 265 and 245 of FIG. 2 during the planning of a new meeting between users U1, U2 and U3. Calendar server application 620 may add a row similar to rows 741/781 to the calendar of U3 in response to the request of step 255 of FIG. 2.

Calendar server application 620 also checks whether any scheduled events are due for each user and sends corresponding reminders (based on the duration specified in column 728). For example, calendar server application 620 may send reminders (corresponding to the steps 310 and 315 of FIG. 3) for meeting "1011" to user U1 at 1:45 PM (15 minutes before the start) and to user U2 at 1:50 PM. The users may join the meeting (as shown by steps 320, 325, and 328 in FIG. 3) after receiving such reminders from calendar server application 620.

Meeting data 630 (in data store 180B) represents a portion of the meeting information maintained by a conference server (150), in particular, conference server application 640. A sample data that may be stored in meeting data 630 is described below with examples.

10. Sample Meeting Data

FIGS. 8A and 8B together depicts a portion of meeting data (630) maintained by a conference server (150) in one embodiment. Each of the Figures is described in detail below Table 800 represents the details of the meetings planned (and conducted) using conference server 150. Column 821 "Meeting ID" specifies the unique identifier associated with the meeting by conference server 150 (similar to column 724), columns 822 "Start" and 823 "Duration" respectively specify the start time and expected duration of the meeting, column 824 "Description" specifies the agenda/description of the meeting (similar to column 725), column 825 "Meeting Status" specifies the status ("Planned", "In Progress", "Completed", "Cancelled") of the meeting and column 826 "Current Participants" specifies the users who have been successfully authenticated (based on the information in table 850) and are currently participating in the meeting.

Each of rows 841-843 specifies the details of a corresponding meeting planned using conference server 150. In particular, row 841 specifies a meeting with id "1011" starting from "3/9, 2009 2:00 PM" and having an expected duration of 60 minutes for "Discussion on cloud computing security policies". Row 841 further specifies that the meeting is "In Progress" and users U1, U2 and U3 are currently participating in the meeting.

Referring to FIG. 8B, table 850 represents the authentication information of the users participating in the planned meetings. Column 861 "User ID" specifies the identifier of a user, while columns 862 "Login ID" and 863 "Password" (values shown as  to indicate encrypted data) respectively specify the login id and password to be used by the user. Thus, row 881 specifies that the user U1 needs to use the login id "S1000" and the corresponding password for authentication with conference server 150**. Similarly, the other rows specify the corresponding authentication information to be used by the respective users.

Referring back to FIG. 6, conference server application 640 (executing in conference server 150) facilitates users to plan and conduct meetings. Conference server application 640 may maintain the details of the meetings as meeting data 630 in data store 180B. For example, conference server application 640 may add rows 841 in response to receiving a create meeting request of step 210 of FIG. 2, and then send the generated meeting ID "1011" as the response of step 215 of FIG. 2.

Conference server application 640 may also update the meeting information during the conducting of meetings. For example, in response to receiving join requests of steps 320, 325 and 328 of FIG. 3, conference server application 640 may first check that the authentication information specified in the join requests matches the information stored in table 850 for the corresponding user ID and then update the status of the meeting (column 825) and the current participants of the meeting (column 826) on successful match. Thus, conference server application 640 may set the value "In Progress" for the meeting "1011" in response to successful match for step 320 and may set the value "U1, U2, U3" after success match in step 328 (assumed to be received at 2:10 PM).

Conference client application 670 (executing in user system 110A) facilitates a user (U1) to participate in a meeting conducted using conference server 150, in particular, conference server application 640. In particular, conference client application 670 facilitates a user to provide authentication information to conference server application 640 and to exchange content such as audio, video, files, messages (text), etc., with other participants after successful authentication. Conference client application 670 also enables the user (U1) to share the desktop of his/her user system with other participants, and also view the desktop shared by another participant.

It may be appreciated that different instances of the conference client application may be executing in the different user systems, thereby enabling the users/participants (U1, U2 and U3) to share/exchange content with each other. In general, a participant U1 uses an instance of the conference client application (670) to send content to conference server application 640 (via path 121), which then forwards the received content to one or more instances executing in other user systems, which in turn provide the content to the other participants (U2 and U3) using the user systems.

Scheduling tool 650, provided according to several aspects of the present invention, simplifies the management of subsequent meetings for participants of a meeting in progress as described below with examples.

11. Scheduling Tool

Scheduling tool 650 is designed to identify a participant of a meeting in progress by periodically inspecting table 800 in meeting data 630. Thus, at the time instance 2:15 PM (on 3/9, 2009), scheduling tool 650 may inspect table 800 to identify that user U1 is a participant (as indicated by column 826) of the meeting "1011" in progress (as indicated by column 825)

Scheduling tool 650 may then determine whether the identified participant (U1) has a subsequent meeting scheduled to start within a next duration. Accordingly, scheduling tool 650 sends a request (via path 123) to calendar server application 620 for the meetings scheduled for user U1 and receives the information of row 742 as the corresponding response.

In one embodiment, calendar server 130 and conference server 150 are designed to use a common login id/password for authentication (commonly termed "Single Sign On") and accordingly scheduling tool 650 is designed to send the authentication information (row 881) of the user U1 to calendar server application 620 when requesting the meetings scheduled for user U1.

The description is continued assuming that the calendar information for all the users are maintained on a single calendar server (130). However, in alternative embodiments, the calendar information may be maintained on different calendar servers, and scheduling tool 650 may accordingly be designed to interact with the different calendar servers (for example, by invoking web services provided by the calendar server applications executing in the different calendar servers) to determine the conflict between the current meeting and a subsequent meeting scheduled for the current participants.

Scheduling tool 650 then checks whether the meeting of row 742 is scheduled to start within a next duration (assumed to be the duration specified in column 728). Since the subsequent meeting having start time 3:30 PM is not scheduled to start within 15 minutes (current time being 2:15 PM), no action is performed. However, when the above steps are performed at 3:15 PM, scheduling tool 650 determines that the meeting in row 742 (with user U5) is a subsequent meeting due to start and may result in a conflict with the meeting in progress, if the current meeting continues for 15 minutes (the next duration).

On finding that a subsequent meeting (with user U5) is scheduled to start within a next duration for user U1 and may result in a conflict with the meeting in progress, scheduling tool 650 requests user U1 for a scheduling option for the subsequent meeting. The manner in which scheduling tool 650 requests a scheduling option for a conflicting subsequent meeting from a participant (user U1) of a meeting in progress is described below with examples.

12. Sample User Interface For Conflicting Subsequent Meeting

Figure 9:
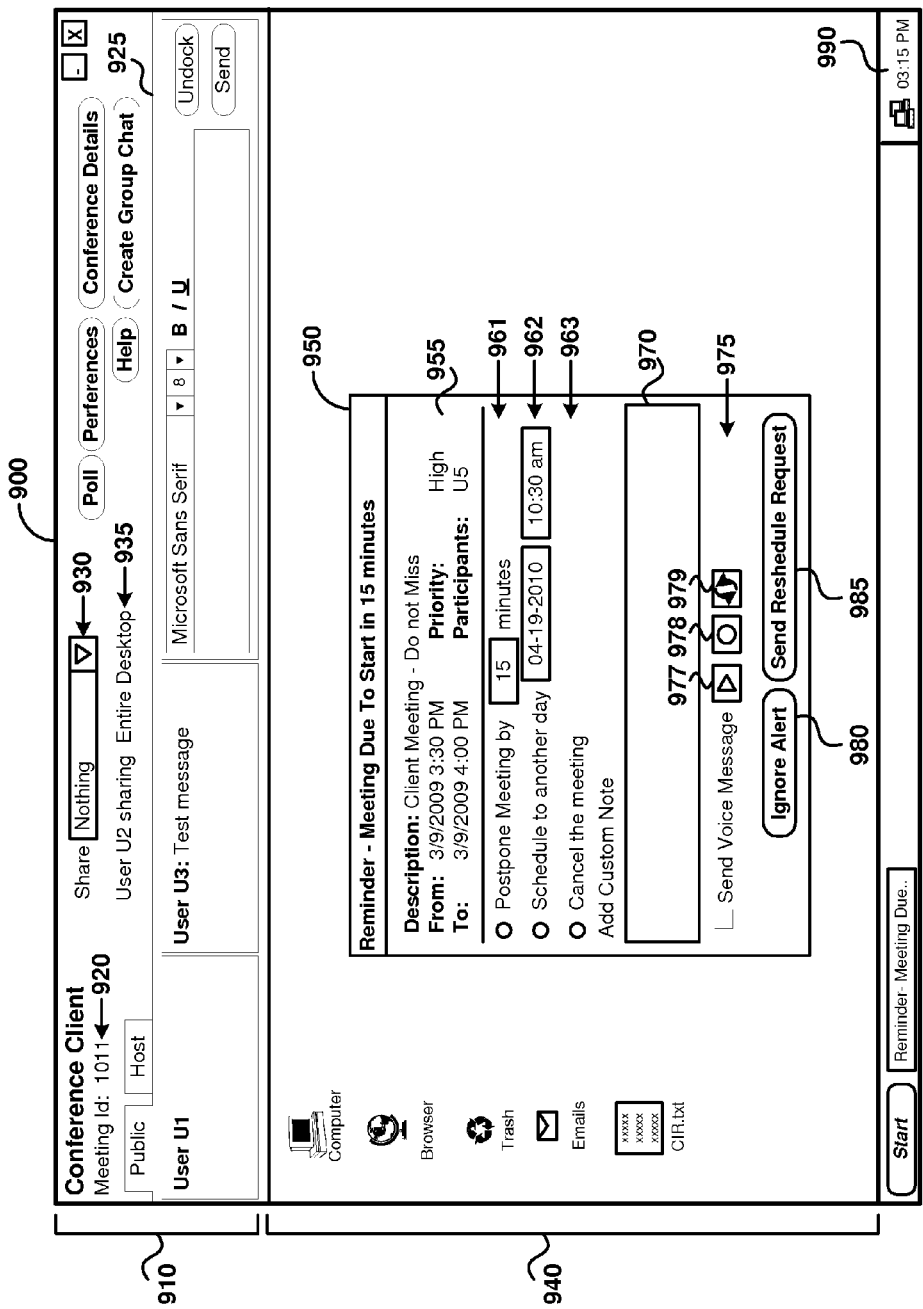
FIG. 9 depicts a user interface displayed to a participant of a current meeting (in progress) when a subsequent meeting is found conflicting with a meeting in progress in one embodiment.

FIG. 9 depicts a user interface displayed to a participant of a current meeting (in progress) when a subsequent meeting is found conflicting with a meeting in progress in one embodiment. Desktop 900 represents a portion of a screen provided by an operating system executing in one of user systems 110A-110N, which may be displayed on a display unit (not shown) associated with the user system. The description is continued assuming that desktop 900 is provided by the operating system executing in (and accordingly displayed on a display unit associated with) user system 110A used by user U1 as part of step 520.

Display area 910 represents a user interface provided by conference client application 670 executing in user system 110A. Display area 910 indicates that a meeting identified by the identifier "1011" (text 920) is in progress, and that the user U1 has not shared anything with the other participants (as indicated by the value "Nothing" in field 930). User U1 may use the text fields provided in display area 925 to send/receive text messages from/to other participants (U2 and U3) of the meeting in progress. Display area 925 is shown displaying a message received from U3.

Text 935 indicates that the user U2 has shared his/her entire desktop (provided by the operating systems executing in user system 110B) with the other participants, and accordingly display 940 depicts a portion of the desktop of user U2. Accordingly, user U1 may view the actions performed by U2 on his/her desktop and may also interact (e.g., click the icons such as "Computer", "Browser", "Emails", etc.) with the shared desktop of U2.

Window 950 (titled "Meeting Reminder") represents a user interface displayed when a subsequent meeting is determined to be scheduled within a next duration by scheduling tool 650 (step 560). Display area 955 displays the details of the subsequent meeting such as the agenda, start/end times, the priority, the expected participants, etc. (corresponding to the data shown in row 742). It may be observed that window 950 is shown displayed at "3:15 PM" (text 990), when the meeting in progress ("1011") is determined to likely overlap (have a conflict) with the subsequent meeting (with user U5).

Each of radio buttons 961-963 (and the associated fields) represents a corresponding scheduling option provided to user U1. In particular, radio button 961 represents the option to postpone the subsequent meeting by a duration (such as 15 minutes, 1 hour, etc.) specified by the participant (in the field shown). Radio button 962 represents the option to reschedule the subsequent meeting on another date (Apr. 19, 2010) and time (10.30 am) specified by the participant (in the respective fields shown). Radio button 963 represents the option to cancel the subsequent meeting. Only a few options are shown here for conciseness, though in alternative embodiments, the set of scheduling options provided to the participant may include less/more options that facilitate the participant to manage the subsequent meetings.

Text area 970 enables the participant to optionally send a custom message along with the notifications to the possible participants of the subsequent meeting. The participant may select one of the scheduling options, specify the date/time/duration for the selected scheduling option, specify a custom message and select button 985 (labeled "Send Reschedule request") to send the provided details to scheduling tool 650 (step 570). Alternatively, user U1 may ignore the meeting reminder by selecting button 980 labeled "Ignore Alert". In the scenario that the meeting reminder is ignored by the participant, scheduling tool 650 may resend the meeting reminder (providing the scheduling options) after waiting for a pre-configured duration (e.g., 5 minutes).

It should be noted that the window 950 is shown in the middle of desktop 900 to illustrate the features of the present invention. However, in alternative embodiments, the user interface of window 950 may be provided in a succinct manner, for example, in the form of an alert window in the right bottom corner of desktop 900 or superimposed on display area 910, thereby enabling user U1 to conduct the meeting in progress (chat with other participants, view the desktop shared by user U2) without interference.

Thus, scheduling tool 650 requests a scheduling option for a conflicting subsequent meeting from a participant (user U1) of a meeting in progress (1011). On receiving the details of a scheduling option from user system 110A (for example, when the user U1 selects/clicks button 985 after selecting one of options 961-963 and providing the associated information), scheduling tool 650 sends a scheduling request (specifying the received scheduling option) to calendar server application 620 (step 540).

Calendar server application 620, in response to the scheduling request, determines the possible participants/recipients (user U5) of the subsequent meeting based on either the information specified in the scheduling request and/or based on calendar data 610 (value of column 726 for the row 742 corresponding to the subsequent meeting).

Calendar server 130 then sends notifications (via path 127) corresponding to the scheduling option selected by the participant (user U1). For example, in response to user selecting radio button 961, calendar server application 620 may send (to user U5) notifications having the message "User U1 wants to postpone the meeting at {date/time} by {duration} minutes. User U1 says: {message}", where {date/time} is replaced by the date and/or time of the subsequent meeting, {duration} is replaced by the duration (15) specified by user U1 in the fields associated with radio button 961 and {message} is replaced by the text provided by user U1 in text area 970.

The sending of such notifications to the possible participants of the subsequent meeting enables the user U5 to be kept informed of the status of participant U1 and accordingly resolve the conflict between the meeting in progress and the subsequent meeting. Thus, participant U1 is enabled to manage the subsequent meeting with user U5, while actively participating in the current meeting.

Referring back to FIG. 6, scheduling tool 650 is also designed to request for a scheduling option for a follow-up meeting to user U1 in step 520, when user U1 indicates that he/she desires to leave/exit the meeting in progress. Sample user interfaces (displayed by scheduling tool 650) for requesting the scheduling option for the subsequent follow-up meeting are described below with examples.

13. Sample User Interfaces For Follow-Up Meetings

Figure 10A:
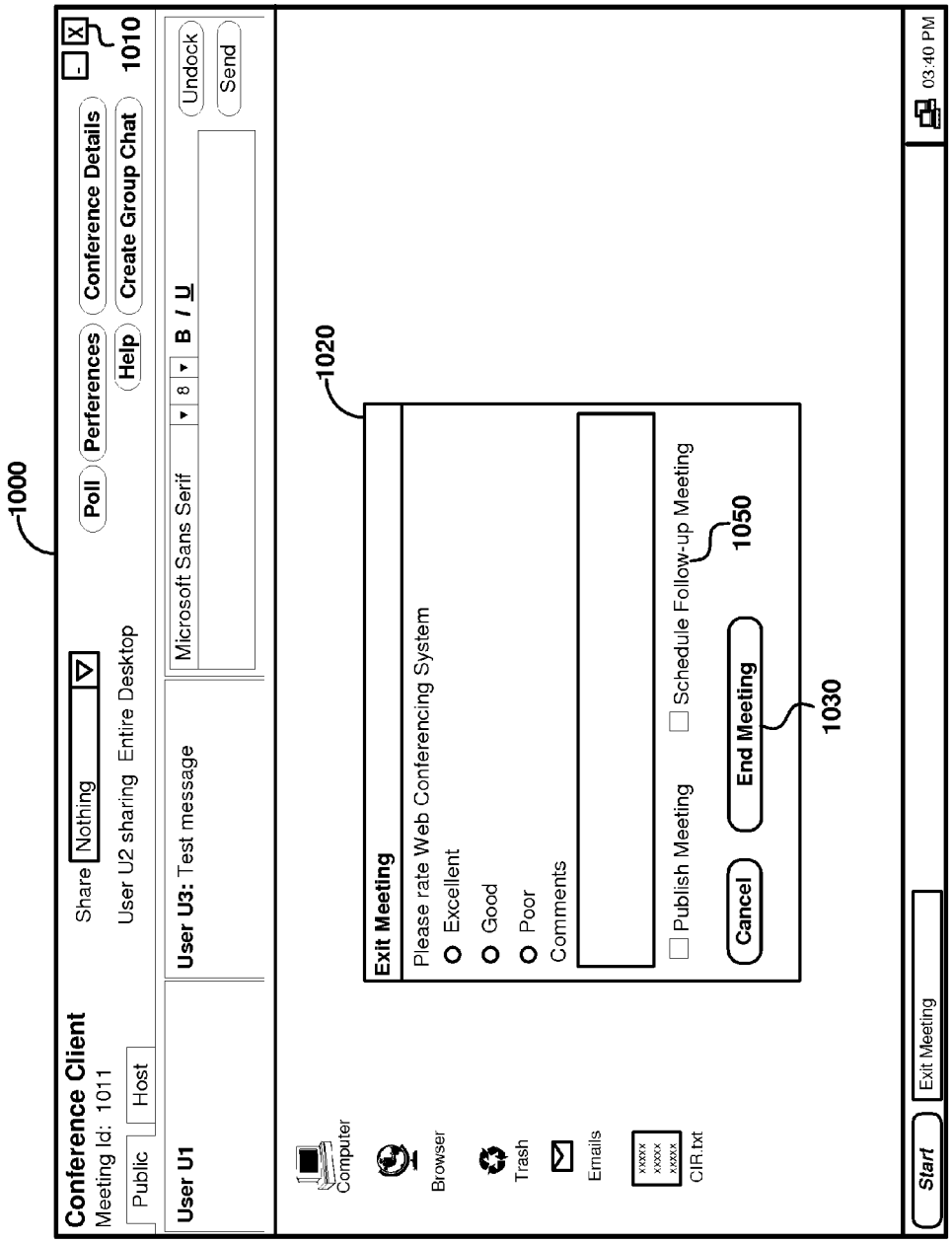
FIGS. 10A and 10B together depict user interfaces enabling management of subsequent follow-up meetings by participants of a current meeting (in progress) in one embodiment.
Figure 10B:
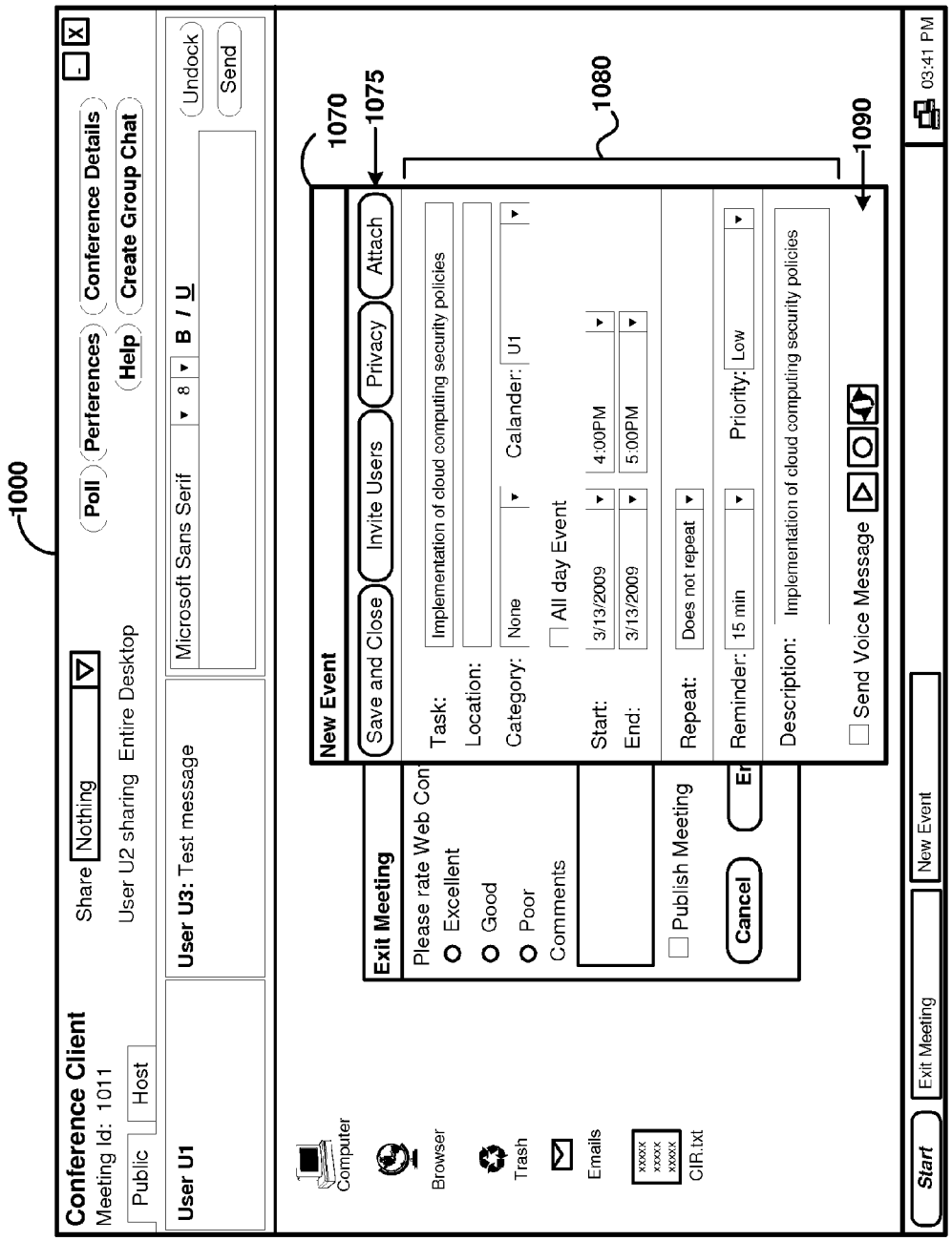

FIGS. 10A and 10B together depict user interfaces enabling management of subsequent follow-up meetings by participants of a current meeting (in progress) in one embodiment. Desktop 1000 of both FIGS. 10A and 10B are shown containing various display elements (such as display area 910, display area 940, etc.) similar to desktop 900 and accordingly their description is not repeated for conciseness.

Window 1020 (titled "Exit Meeting") represents a user interface displayed when a participant (user U1) of a meeting in progress (1011) desired to leave/log out of the meeting. Window 1020 may be displayed in response to the participant clicking on close button 1010. The participant may select/click button 1030 (labeled "End Meeting") to leave/exit the meeting in progress.

Check box 1050 (labeled "Schedule Follow-up Meeting") represents a request for planning/scheduling a subsequent follow-up meeting. A participant (user U1) may select check box 1050 to indicate that a subsequent follow-up meeting is sought to be planned/scheduled to scheduling tool 650.

Referring to FIG. 10B, window 1070 (titled "New Event") represents a user interface displayed by scheduling tool 650 in response to the selection of check box 1050 by user U1. Window 1070 enables the user/participant U1 to specify a scheduling option for the subsequent follow-up meeting. In particular, display area 1080 enables the user U1 to specify the details such as the start/end time, the description/agenda, etc. of the follow-up meeting and also to indicate the reminder duration and the priority associated with the meeting for the participant (user U1). Display area 1075 is shown containing a button labeled "Invite Users" for sending invitations to users (other than the current participants) for the follow-up meeting and another button labeled "Save and Close" for sending the information to scheduling tool 650.

On receiving the details of a scheduling option from user system 110A (for example, when the user U1 selects/clicks button labeled "Save and Close" after specifying the details of the follow-up meeting), scheduling tool 650 sends a scheduling request (specifying the received scheduling option) to calendar server application 620 (step 540).

Calendar server application 620, in response to the scheduling request for a subsequent follow-up meeting, first determines the recipients as the participants of the current meeting (users U1, U2 and U3) and additional users invited for the follow-up meeting (assumed to be none). Calendar server application 620 then updates the corresponding calendar of each of the determined participants (U1, U2 and U3) by adding an event for the follow-up meeting (according to the scheduling option received from the participant). For example, in response to receiving the information shown in display area 1080, calendar server application 620 may add a new row/event to tables/calendars 700 and 750 of users U1 and U2 indicating a start time of "3/13, 2009 4:00 PM", a end time of "3/13, 2009 5:00 PM", a description as "Implementation of cloud computing security policies", etc.

Scheduling tool 650, in addition to sending the scheduling request, may also be designed to add a new row to table 800 corresponding to the subsequent follow-up meeting, in the scenario that the meeting is indicated to be planned/conducted using conference server 150. Scheduling tool 650 may then include the details of the newly created meeting in the scheduling request, thereby enabling calendar server application 620 to forward the meeting details to the possible participants of the follow-up meeting.

Scheduling tool 650 may similarly perform the steps of FIG. 5 for another participant (such as user U2) of the meeting in progress, and also for each participant of each meeting in progress. Thus, scheduling tool 650 simplifies the management of subsequent meetings for participants of a meeting in progress.

It may be appreciated that the notifications sent to the users (participants for the subsequent meeting) can be in forms, other than text based notifications. A participant of a current meeting in progress may send voice messages as well, as described below with examples.

14. Voice Notifications

According to an aspect of the present invention, the conference server (150) enables a user/participant of a meeting in progress to record a voice message in response to finding a conflict between the meeting in progress and a subsequent meeting. The conference server then faciliates the possible participants of the subsequent meeting to listen to the recorded voice message. The voice message may be delivered in the form of a voice mail message (i.e., as if the present participant left a voicemail message if the intended recipient did not answer a phone call), an attachment to an email message (which can be accessed by suitable email client applications noted above), an automated replay on a voice call to a phone system (i.e., a notification server calls the intended recipient and replays the message over the phone), etc.

Referring to FIG. 9, display area 975 in window 950 enables a participant (user U1) of the meeting in progress to send a voice message as part of the notifications to the possible participants (user U5) of the subsequent meeting. The participant may first select the checkbox to indicate that a voice message is sought to be sent, and then select the "Record" button 977 to start recording the voice message. The participant may then speak the message in a microphone connected to user system 110A, and select the "Stop" button 978 to indicate the completion of the message. The participant may also select the "Replay" button 979 to listen to the recorded voice message (e.g., to confirm that the desired voice message is recorded).

When the user U1 selects/clicks button 985 after selecting one of options 961-963 and recording to voice message (after selecting the checkbox in display area 975), scheduling tool 650 includes the voice message in the scheduling request (also specifying the received scheduling option) sent to calendar server application 620 (step 540). Calendar server application 620 may then send the voice message in the form of a voice mail message, an attachment to an email message, etc. as the notifications in step 548.

A participant of a meeting in progress may similarly provide a voice message when scheduling follow-up meetings. For example, the participant may record (similar to the manner described above) a voice message to be sent to the participants of the follow-up/subsequent meeting using the checkbox/buttons provided in display area 1090 of FIG. 10B. Scheduling tool 650 then includes the recorded voice message in the scheduling request sent to calendar server application 620 (step 540), which in turn sends the voice messages (in any of the formats noted above) to the participants of the follow-up meeting.

It may be appreciated that though scheduling tool 650 and conference server application 640 are shown as separate executable modules executing in conference server 150, in alternative embodiments, the functions of scheduling tool 650 and conference server application 640 may be performed using a single executable module. Furthermore, as noted above, the functions of calendar server 130, conference server 150 and notification server 170 may be integrated and provided in a single system. An example of such an integrated system is Oracle Beehive Collaboration Software available from Oracle Corporation.

It should be further appreciated that the features described above can be implemented in various embodiments as a desired combination of one or more of hardware, executable modules, and firmware. The description is continued with respect to an embodiment in which various features are operative when the software instructions described above are executed.

15. Digital Processing System

Figure 11:
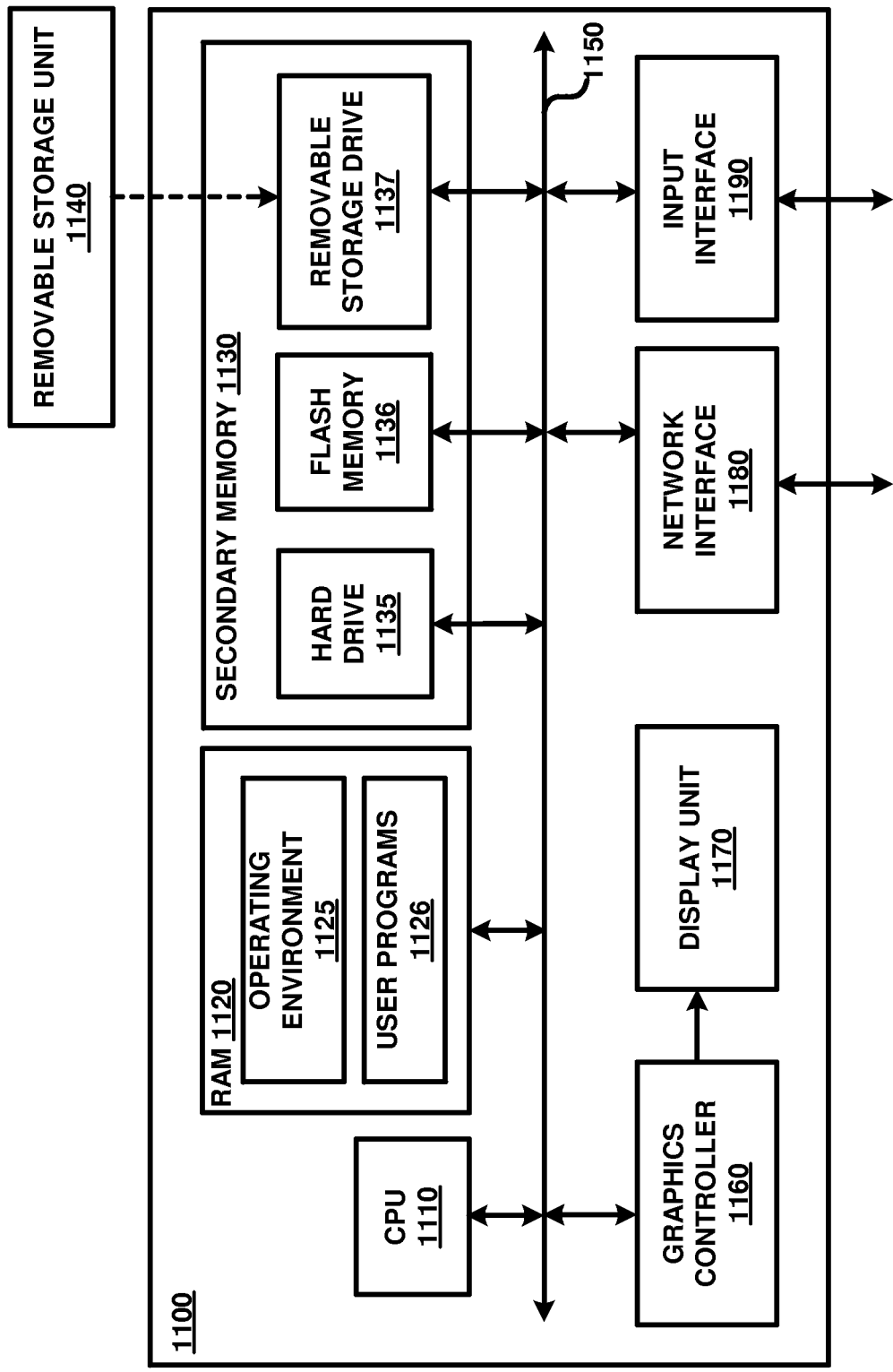
FIG. 11 is a block diagram illustrating the details of a digital processing system in which various aspects of the present invention are operative by execution of appropriate software instructions.

FIG. 11 is a block diagram illustrating the details of digital processing system 1100 in which various aspects of the present invention are operative by execution of appropriate software instructions. Digital processing system 1100 may correspond to conference server 150 (or any other system executing scheduling tool 650) or one of user systems 110A-110N.

Digital processing system 1100 may contain one or more processors (such as a central processing unit (CPU) 1110), random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit.

RAM 1120 may receive instructions from secondary memory 1130 using communication path 1150. RAM 1120 is shown currently containing software instructions constituting shared environment 1125 and/or user programs 1126 (such as audio/video converters, email/chat client applications, database applications, etc.). Shared environment 1125 contains utilities shared by user programs, and such shared utilities include operating system, device drivers, virtual machines, flow engine, etc., which provide a (common) run time environment for execution of user programs/applications.

Graphics controller 1160 generates display signals (e.g., in RGB format) to display unit 1170 based on data/instructions received from CPU 1110. Display unit 1170 contains a display screen to display the images (e.g., the screens of FIGS. 9, 10A-10B) defined by the display signals. Input interface 1190 may correspond to a keyboard and a pointing device (e.g., touch-pad, mouse) and may be used to provide the user inputs (such as the details of the scheduling option, etc.) required for several aspects of the present invention. Network interface 1180 provides connectivity to a network (e.g., using Internet Protocol), and may be used to communicate with other connected systems (such as calendar server 130, notification server 170, etc.) of FIG. 1.

Secondary memory 1130 may contain hard drive 1135, flash memory 1136, and removable storage drive 1137. Secondary memory 1130 may store the data (for example, data of FIGS. 8A-8B) and software instructions (for example, for performing the steps of FIG. 4), which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1137.

Removable storage unit 1140 may be implemented using medium and storage format compatible with removable storage drive 1137 such that removable storage drive 1137 can read the data and instructions. Thus, removable storage unit 1140 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

16. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating participants of meetings to manage subsequent meetings, said method being performed in a conference server, said method comprising:

maintaining, in said conference server, information indicating a set of present participants of a meeting in progress, wherein each of said set of present participants has joined said meeting in progress but has not yet logged out of said meeting;

identifying, in said conference server, a participant of said meeting in progress as one of said set of present participants, wherein said identifying is performed by examining said information indicating said set of present participants; and upon said identifying, requesting from said participant a scheduling option for a subsequent meeting, wherein said subsequent meeting is a meeting that follows said meeting in progress, wherein said participant is already scheduled, prior to said identifying, to attend said subsequent meeting, said set of present participants containing at least one participant who has joined said meeting but has not yet logged out such that said meeting is in progress when said identifying is performed, wherein said scheduling option is requested from said participant by said conference server in a duration when said meeting is in progress.

2. The method of claim 1, further comprising:

receiving, from said participant, a first scheduling option for said subsequent meeting as a response to said requesting;

determining a set of possible participants already scheduled to attend said subsequent meeting; and informing said set of possible participants of said first scheduling option received from said participant, wherein said receiving, said determining and said informing are also performed by said conference server in said duration when said meeting is in progress.

3. The method of claim 2, further comprising:

finding a conflict in schedule between said meeting in progress and said subsequent meeting for at least one of said present participants, wherein said finding is also performed in said duration when said meeting is in progress, wherein said scheduling option is requested for said subsequent meeting in response to said finding of said conflict.

4. The method of claim 3, wherein said finding finds said conflict at a current time instance if said subsequent meeting is scheduled to start within a next duration from said current time instance, whereby said meeting in progress if continued by said next duration from said current time instance results in an overlap between said meeting in progress and said subsequent meeting.

5. The method of claim 4, wherein said finding comprises:

inspecting a calendar of said participant to identify a set of meetings scheduled for said participant; and checking whether there is one meeting in said set of meetings having a start time within said next duration from said current time, wherein said checking determines that said subsequent meeting is said one meeting.

6. The method of claim 5, wherein said determining comprises:

examining a corresponding calendar of a plurality of users to determine said set of possible participants planning to participate in said subsequent meeting.

7. The method of claim 6, wherein said informing comprises sending a notification specifying said first scheduling option received from said participant.

8. The method of claim 7, further comprising enabling said user to record a voice message in response to finding of said conflict, wherein said notification comprises said voice message such that each of said set of possible participants can listen to said voice message.

9. The method of claim 8, wherein said voice message is delivered in the form of one of a voice mail message, an attachment to an email message, and an automated replay on a voice call to a phone system.

10. The method of claim 2, further comprising:
providing a set of scheduling options to said participant, said set of scheduling options comprising said first scheduling option,
wherein said receiving receives said first scheduling option in response to said participant selecting said first scheduling option from said set of scheduling options.

11. The method of claim 10, wherein said providing comprises displaying said set of scheduling options on a display unit associated with a system used by said participant.

12. The method of claim 2, further comprising:
receiving an input from said user requesting to logout from said meeting in progress, wherein said input is received in a duration when said meeting is in progress,
wherein said scheduling option is requested for said subsequent meeting in response to said input that said participant wishes to logout from said meeting in progress,
wherein said subsequent meeting comprises a follow-up meeting for said meeting in progress, wherein said first scheduling option specifies the details of said follow-up meeting.

13. The method of claim 12, wherein said determining comprises:
including the participants of said meeting in progress and a set of users invited for said follow-up meeting in said set of possible participants.

14. The method of claim 13, wherein said informing comprises:
adding an event for said follow-up meeting to the calendars of each of said set of possible participants, wherein said event corresponds to said first scheduling option received from said participant.

15. A non-transitory machine readable medium storing one or more sequences of instructions for causing a conference server to facilitate participants of meetings to manage subsequent meetings, wherein execution of said one or more sequences of instructions by one or more processors contained in said conference server causes said conference server to perform the actions of:
storing data in a memory indicating a corresponding set of participants for each of a plurality of meetings in progress, wherein each of said set of present participants has joined the corresponding meeting in progress but has not yet logged out of the meeting;
examining said data in said memory to identify a participant of a meeting in progress and a subsequent meeting said participant is already scheduled to attend;
requesting from said participant, in a duration when said meeting is in progress, a scheduling option for said subsequent meeting said participant is already scheduled to attend.

16. The non-transitory machine readable medium of claim 15, further comprising one or more instructions for:
receiving, from said participant, a first scheduling option for said subsequent meeting as a response to said requesting;
determining a set of possible participants of said subsequent meeting; and
informing said set of possible participants of said first scheduling option received from said participant,
wherein said receiving, said determining and said informing are also performed by said conference server in said duration when said meeting is in progress.

17. The non-transitory machine readable medium of claim 16, further comprising one or more instructions for:
inspecting a calendar of said participant to identify a set of meetings scheduled for said participant prior to said examining; and
checking whether there is one meeting in said set of meetings having a start time within said next duration from said current time, whereby said meeting in progress if continued by said next duration results in an overlap between said meeting in progress and said one meeting,
wherein said scheduling option is requested for said subsequent meeting in response to said checking determining that said subsequent meeting is said one meeting.

18. The non-transitory machine readable medium of claim 17, further comprising:
receiving an input from said user requesting to logout from said meeting in progress, wherein said input is received in a duration said meeting is in progress,
wherein said scheduling option is requested for said subsequent meeting in response to said input that said participant wishes to logout from said meeting in progress,
wherein said subsequent meeting comprises a follow-up meeting for said meeting in progress, wherein said first scheduling option specifies the details of said follow-up meeting.

19. A computing system comprising:
a calendar server to maintain a corresponding calendar for each of a plurality of users, said corresponding calendar indicating the specific meetings and the corresponding durations the user is already scheduled to attend; and
a conference server to facilitate participants of meetings to manage subsequent meetings, said conference server operable to:
store data indicating which of said plurality of users have logged on to which of a plurality of meetings, but have not yet logged out such that said stored data indicates the present participants of each of said plurality of meetings;
examine said data to determine that a first meeting is in progress and a first user is a participant of said first meeting, said plurality of meetings comprising said first meeting and said plurality of users comprising said first user;
send to said calendar server, a request for information of the subsequent meetings already scheduled for said first user, wherein said request is sent while said first meeting is in progress and said first user is a participant of said first meeting;
receive from said calendar server, a set of subsequent meetings scheduled for said first user as a response to said first request;
identify that a second subsequent meeting of said set of subsequent meetings has a start time within a next duration from a current time to present a conflict between said meeting in progress and said second subsequent meeting for said first user, wherein said conflict is present since said first meeting, if continued by said next duration results in an overlap between said first meeting and said second subsequent meeting; and
upon said identifying, request from said first user a scheduling option for said second subsequent meeting, wherein said request is operable in a duration when said first meeting is in progress.

20. The computing system of claim 19, wherein said conference server is further operable to:
- receive, from said first user, a first scheduling option for said second subsequent meeting as a response to said request; and
- send to said calendar server, a scheduling request for said second subsequent meeting, said scheduling request indicating said first scheduling option,
- whererin said calendar server is operable to:
- determine a set of users who are likely to participate in said second subsequent meeting, said plurality of users comprising said set of users; and
- inform said set of users said first scheduling option received from said first user.

21. The computing system of claim 20, wherein said conference server is further operable to:
- find a conflict in schedule between said meeting in progress and said subsequent meeting for at least one of said present participants,
- wherein said finding is also performed in said duration when said meeting is in progress,
- wherein said scheduling option is requested for said subsequent meeting in response to said finding of said conflict.

22. The computing system of claim 21, wherein said conference server finds said conflict at a current time instance if said subsequent meeting is scheduled to start within a next duration from said current time instance, whereby said meeting in progress if continued by said next duration from said current time instance results in an overlap between said meeting in progress and said subsequent meeting.

23. The computing system of claim 22, to perform said find said conference server being further operable to:
- inspect a calendar of said first user to identify a set of meetings scheduled for said first user; and
- check whether there is one meeting in said set of meetings having a start time within said next duration from said current time,
- wherein said checking determines that said subsequent meeting is said one meeting.

24. The computing system of claim 23, to perform said determination of said set of users said conference server being further operable to:
- examine a corresponding calendar of a plurality of users to determine said set of possible users planning to participate in said subsequent meeting.

25. The computing system of claim 24, to perform said inform said conference server being further operable to send a notification specifying said first scheduling option received from said first user.

26. The computing system of claim 25, wherein said conference server is further operable to enable said user to record a voice message in response to finding of said conflict,
- wherein said notification comprises said voice message such that each of said set of possible participants can listen to said voice message.

27. The computing system of claim 26, wherein said voice message is delivered in the form of one of a voice mail message, an attachment to an email message, and an automated replay on a voice call to a phone system.

28. The computing system of claim 20, wherein said conference server is further operable to:
- provide a set of scheduling options to said first user, said set of scheduling options comprising said first scheduling option,
- wherein said conference server is operable to receive said first scheduling option in response to said first user selecting said first scheduling option from said set of scheduling options.

29. The computing system of claim 28, to perform said provide, said conference server is operable to display said set of scheduling options on a display unit associated with a system used by said first user.

30. The computing system of claim 20, wherein said conference server is further operable to:
- receive an input from said user requesting to logout from said meeting in progress, wherein said input is received in a duration when said meeting is in progress,
- wherein said scheduling option is requested for said subsequent meeting in response to said input that said first user wishes to logout from said meeting in progress,
- wherein said subsequent meeting comprises a follow-up meeting for said meeting in progress, wherein said first scheduling option specifies the details of said follow-up meeting.

31. The computing system of claim 30, wherein to perform said determination of said set of users, said conference server is further operable to:
- include the participants of said meeting in progress and a set of users invited for said follow-up meeting in said set of possible participants.

32. The computing system of claim 31, to perform said inform, said conference server is further operable to:
- add an event for said follow-up meeting to the calendars of each of said set of possible participants, wherein said event corresponds to said first scheduling option received from said first user.

* * * * *

UNITED STATES PATENT AND TRADEMARK OFFICE
CERTIFICATE OF CORRECTION

PATENT NO.         : 8,577,974 B2                                           Page 1 of 1
APPLICATION NO.    : 12/831284
DATED              : November 5, 2013
INVENTOR(S)        : Paulsami et al.

It is certified that error appears in the above-identified patent and that said Letters Patent is hereby corrected as shown below:

In the Specification

In column 10, line 10, delete "though" and insert -- through --, therefor.

In column 13, line 37, delete ""3/9, 2009" and insert -- "3/9/2009 --, therefor.

In column 13, line 37, delete ""3/9, 2009" and insert -- "3/9/2009 --, therefor.

In column 14, line 32, delete ""3/9, 2009" and insert -- "3/9/2009 --, therefor.

In column 15, line 33-34, delete "3/9, 2009)," and insert -- 3/9/2009), --, therefor.

In column 18, line 50, delete ""3/13, 2009" and insert -- "3/13/2009 --, therefor.

In column 18, line 51, delete ""3/13, 2009" and insert -- "3/13/2009 --, therefor.

In column 19, line 11, delete "faciliates" and insert -- facilitates --, therefor.

In the Claims

In column 25, line 8, in Claim 20, delete "whererin" and insert -- wherein --, therefor.

Signed and Sealed this
Third Day of June, 2014

Michelle K. Lee
*Deputy Director of the United States Patent and Trademark Office*